(12) United States Patent
Urban et al.

(10) Patent No.: US 11,718,766 B2
(45) Date of Patent: *Aug. 8, 2023

(54) SELF-REPAIRING POLYURETHANE NETWORKS

(71) Applicant: Clemson University, Clemson, SC (US)

(72) Inventors: Marek W. Urban, Clemson, SC (US); Ying Yang, Clemson, SC (US)

(73) Assignee: Clemson University, Clemson, SC (US)

( * ) Notice: Subject to any disclaimer, the term of this patent is extended or adjusted under 35 U.S.C. 154(b) by 282 days.

This patent is subject to a terminal disclaimer.

(21) Appl. No.: 17/093,045

(22) Filed: Nov. 9, 2020

(65) Prior Publication Data

US 2021/0062036 A1    Mar. 4, 2021

Related U.S. Application Data

(62) Division of application No. 16/045,448, filed on Jul. 25, 2018, now abandoned, which is a division of application No. 15/037,214, filed as application No. PCT/US2014/049961 on Aug. 6, 2014, now Pat. No. 10,077,378.

(60) Provisional application No. 61/905,574, filed on Nov. 18, 2013.

(51) Int. Cl.
| | |
|---|---|
| C08G 18/64 | (2006.01) |
| C09D 175/08 | (2006.01) |
| C08B 11/02 | (2006.01) |
| C08B 37/00 | (2006.01) |
| C08B 37/08 | (2006.01) |
| C08G 18/48 | (2006.01) |
| C09D 175/04 | (2006.01) |
| C08G 18/32 | (2006.01) |
| C08G 18/40 | (2006.01) |
| C08G 18/24 | (2006.01) |
| C08G 18/72 | (2006.01) |
| C09D 5/00 | (2006.01) |

(52) U.S. Cl.
CPC ............ *C09D 175/08* (2013.01); *C08B 11/02* (2013.01); *C08B 37/00* (2013.01); *C08B 37/003* (2013.01); *C08B 37/0045* (2013.01); *C08B 37/0075* (2013.01); *C08G 18/242* (2013.01); *C08G 18/3215* (2013.01); *C08G 18/4081* (2013.01); *C08G 18/4833* (2013.01); *C08G 18/6484* (2013.01); *C08G 18/72* (2013.01); *C09D 5/00* (2013.01); *C09D 175/04* (2013.01)

(58) Field of Classification Search
CPC .................................................. C08G 18/6484
See application file for complete search history.

(56) References Cited

U.S. PATENT DOCUMENTS

| | | | | |
|---|---|---|---|---|
| 2006/0122355 | A1* | 6/2006 | O'Connor | C08G 18/6484 528/44 |
| 2007/0179210 | A1* | 8/2007 | Swaniker | C08G 18/2825 521/172 |
| 2010/0266784 | A1* | 10/2010 | Urban | C09D 175/04 536/2 |

FOREIGN PATENT DOCUMENTS

WO    WO-2005095462 A1 * 10/2005    ............... A61K 8/73

* cited by examiner

*Primary Examiner* — Michael L Leonard
(74) *Attorney, Agent, or Firm* — Joseph T. Guy; Patent Filing Specialist Inc.

(57) ABSTRACT

The present invention provides alkyl substituted polysaccharide compositions and methods of repairing substrates involving use of the alkyl substituted polysaccharide compositions.

9 Claims, 8 Drawing Sheets

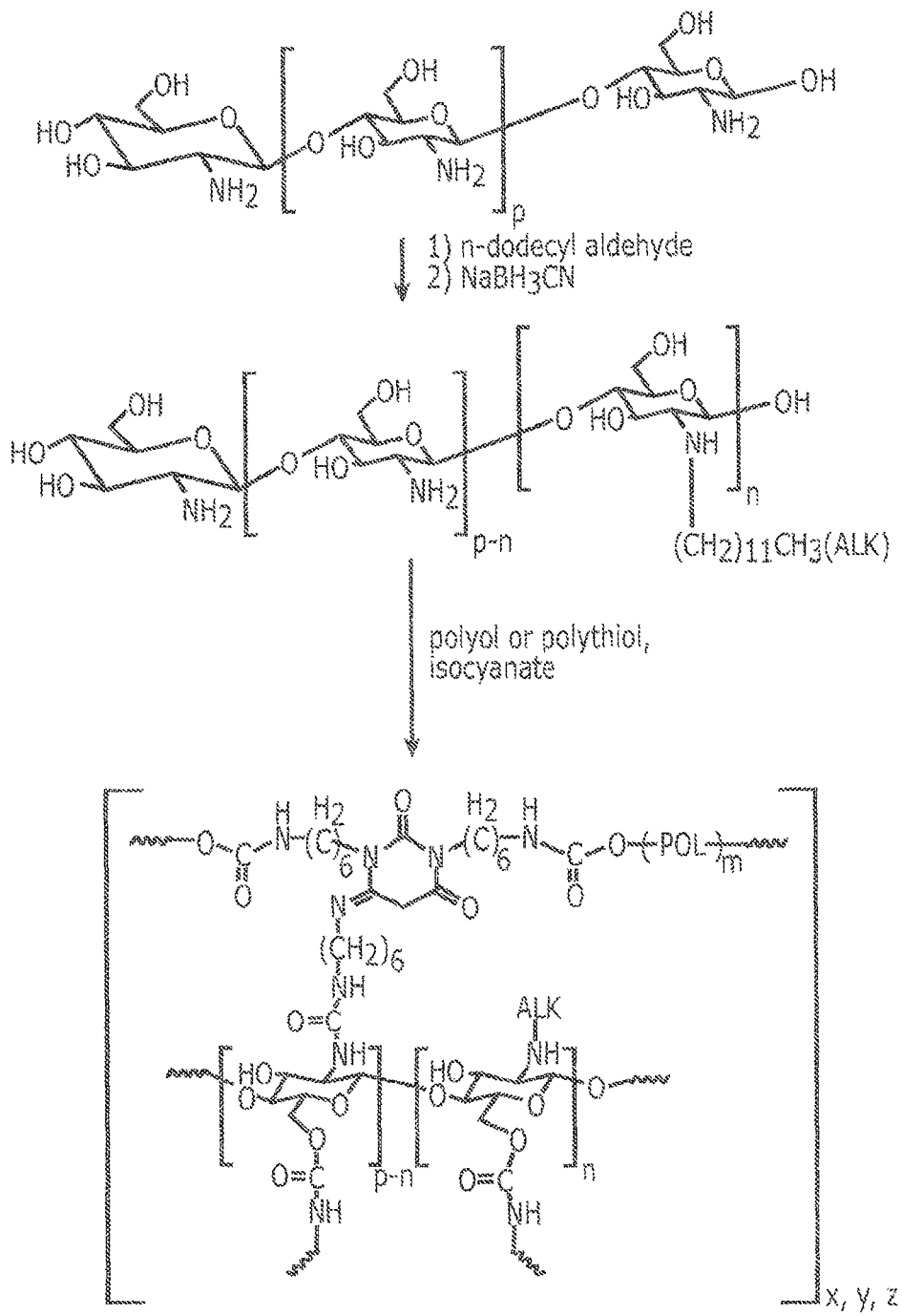

POL = a polyol or a polythiol, ALK is $C_{12}$, p = number of monomeric units in polysaccharide, n = number of monomeric units modified with ALK, m = the number of monomeric units of polyol or polythiol, x = the moles of polysaccharide used to produce the composition, y = the moles of isocyanate used to produce the composition and z = the moles of polyol or polythiol used to produce the composition.

FIG. 1 p = number of monomeric units in the polysaccharide, n = the number of monomeric units alkylated with $C_{12}$, q = the moles of catechol used to produce the composition, x = the moles of polysaccharide used to produce the composition, y = the moles of isocyanate used to produce the composition and z = the moles of polyol or polythiol used to produce the composition.

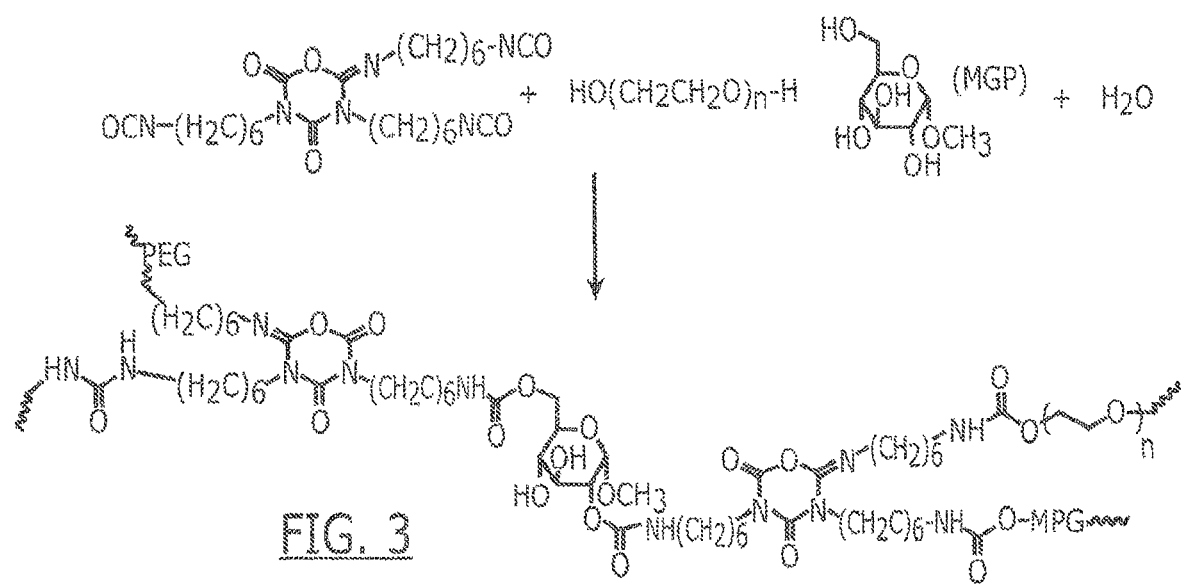
FIG. 3
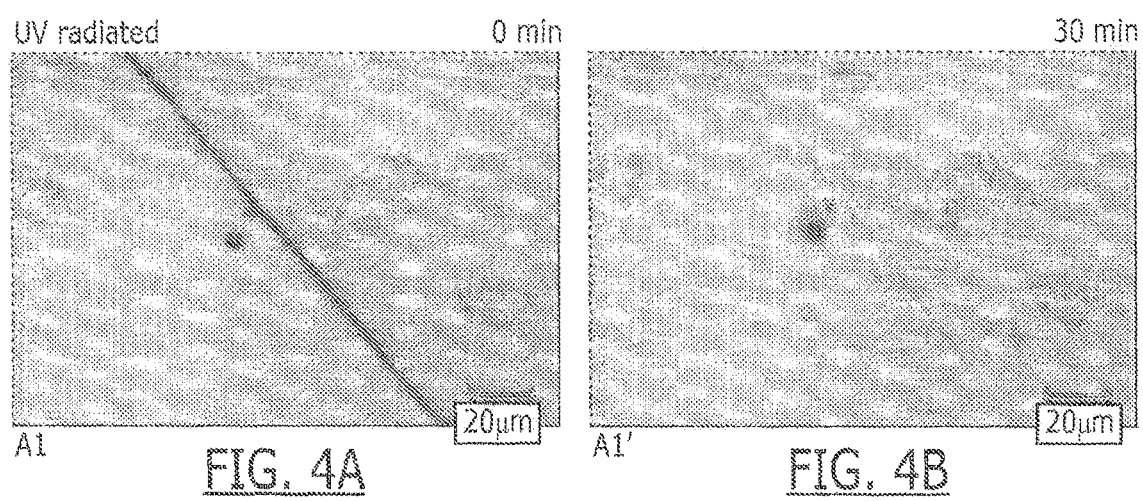
FIG. 4A
FIG. 4B

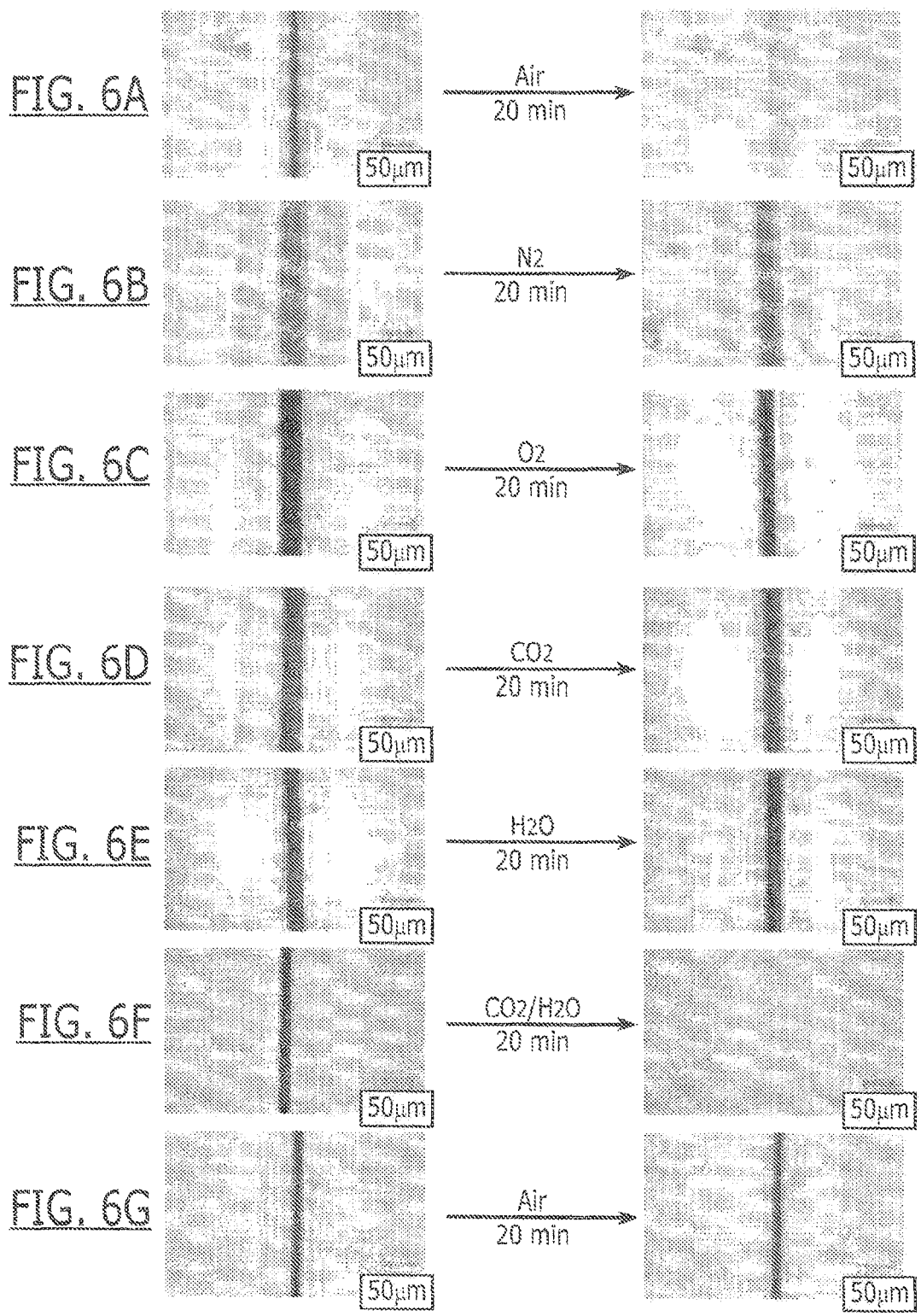

SELF-REPAIRING POLYURETHANE NETWORKS

STATEMENT OF PRIORITY

This application is a divisional application of U.S. patent application Ser. No. 16/045,448, filed Jul. 25, 2018, which is a divisional of U.S. patent application Ser. No. 15/037,214 filed May 17, 2016, now U.S. Pat. No. 10,077,378 issued Sep. 18, 2018, which is a 35 USC § 371 filing of PCT/US14/49961 filed Aug. 6, 2014 which, in turn, claims the benefit, under 35 U.S.C. § 119(e), of U.S. Provisional Application No. 61/905,574, filed Nov. 18, 2013, the entire contents of which are all incorporated by reference herein.

FIELD

The present invention relates to polymer compositions, coatings and related methods. In particular, the polymer compositions, coatings and related methods may permit polymer compositions and coatings to self-repair damage upon exposure to sources such as an ultraviolet, ferric ion, carbon dioxide and/or water source.

BACKGROUND

Polymers, such as polyurethanes, have many properties that qualify them as high performance polymeric materials, but these polymers still have shortcomings. For example, polyurethanes still suffer from mechanical damage, such as when an object hits a vehicle, it is likely that it will leave a scratch at a minimum. In order to combat mechanical damage, several industries, such as the auto industry, have a need for coatings with high scratch resistance or the ability to self-repair. In addition, several industries have a need for coatings that can self-repair after exposure to ferric ion to minimize corrosion to an object's surface.

Attempts have been made by others to repair mechanical damage to various substrates. One such example includes epoxy matrices containing a glass hollow fiber filled with a monomer and an initiator with the "bleeding" ability to heal polymer networks during crack formation. Another approach utilized a micro-encapsulated dicyclopentadiene monomer in a catalyst embedded polymer matrix, which healed the crack by the ring opening of the monomer. Reversibility of Diels-Alder reactions resulted in another approach to thermally repair damaged areas which utilized maleimide-furan adducts. Mimicking of microvascular structures, water-responsive expandable gels, and formation of supramolecular assemblies are other avenues of remendability. Urban, US 2010/0266784, utilized cyclic oxide-substituted chitosan polyurethane networks for repair of mechanically damaged substrates.

While some progress has been made in attempts to repair damage to various types of systems, coatings still lack the ability to repair mechanical damage to which they are exposed. Thus, a need still exists for polymers that are capable of self repairing mechanical damage to which they are exposed.

SUMMARY

In view of the foregoing, polymeric compositions and related methods are provided as embodiments of the present invention. Methods of making the compositions are provided. Methods of using the compositions are also provided. The polymeric compositions and related methods allow substrates upon which the compositions are applied to self-repair mechanical damage upon exposure to ultraviolet sources, such as the sun, self-repair mechanical damage upon exposure to a carbon dioxide-water source or self-repair corrosive damage upon exposure to ferric ion sources.

As an embodiment of the present invention, an alkyl substituted polysaccharide composition is provided. In an embodiment, the alkyl substituted polysaccharide composition is an alkyl substituted polysaccharide composition comprising:

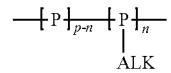

wherein P is a polysaccharide, or combinations thereof, ALK is a $C_1$-$C_{20}$ alkyl; p=the number of monomeric units in the polysaccharide and n=the number of monomeric units modified with ALK. In an aspect, p and n each independently range from about 5 to about 650.

As another embodiment of the present invention, an alkyl substituted polysaccharide composition is provided. In an embodiment, the alkyl substituted polysaccharide composition is an alkyl substituted polysaccharide composition comprising:

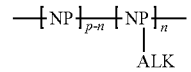

wherein NP is a natural polysaccharide compound, ALK is an alkyl group having from 1-20 carbons, p=the number of monomeric units in the polysaccharide and n=the number of monomeric units modified with ALK. In an aspect, p and n each independently range from about 5 to about 650.

As another embodiment of the present invention, an alkyl substituted chitosan composition is provided. In this embodiment, the alkyl substituted chitosan composition comprises:

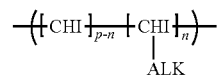

wherein CHI is a chitosan compound and ALK is an alkyl group having from 1-20 carbons, p=the number of monomeric units in the polysaccharide and n=the number of monomeric units modified with ALK. In an aspect, n and m each independently range from about 5 to about 650.

In an aspect, the alkyl substituted chitosan composition comprises:

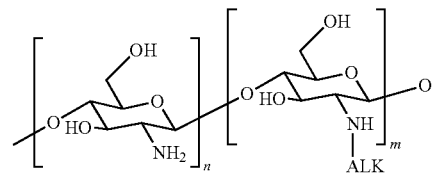

wherein n=is the number of monomeric units in the polysaccharide and m=is the number of monomeric units modified with ALK in the composition. Alkyl is an alkyl group having from 1 to 20 carbons. In an aspect, n and m each independently range from about 5 to about 650.

Besides chitosan, other polysaccharides such as chitin, cellulose, heparin, pectin or combinations thereof can be used. In some embodiments, monosaccharides such as glucose, Fructose, galactose, or combinations thereof can be used. As an embodiment of the present invention, an alkyl substituted natural polysaccharide composition is provided. The composition comprises:

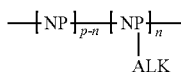

wherein NP=a natural polysaccharide compound selected from the group consisting of chitosan and heparin, and combinations thereof, ALK=an alkyl group having from 1-20 carbons, p=the number of monomeric units in the polysaccharide and n=the number of monomeric units modified with ALK. In an aspect, p and n each independently range from about 5 to about 650. In some embodiments, NP is replaced with a monosaccharide (M) as described herein or a polysaccharide (P) as described herein, which can be natural or unnatural.

As an embodiment of the present invention, an alkyl substituted natural polysaccharide composition is provided.

In this embodiment, the alkyl substituted natural polysaccharide composition comprises:

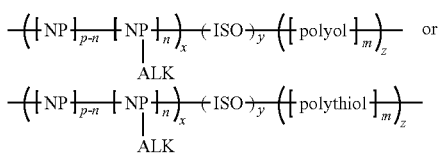

wherein NP is a natural polysaccharide compound, ALK is an alkyl group having 1-20 carbons, ISO is an isocyanate, p=the number of monomeric units in the polysaccharide, n=the number of monomeric units modified with ALK in the polysaccharide, m=the number of monomeric units of polyol or polythiol, x=the moles of polysaccharide used to produce the composition, y=the moles of isocyanate used to produce the composition and z=the moles of polyol used to produce the composition. In one aspect, the p and n values range from about 5 to about 650 and m ranges from about 5 to about 10,000. In another aspect, the molar ratios of x and z range from 0.001 to 1 and y=1. In some embodiments, NP is replaced with a monosaccharide (M) as described herein or a polysaccharide (P) as described herein, which can be natural or unnatural.

As an embodiment of the present invention, an alkyl substituted polysaccharide polyurethane composition is provided.

In this embodiment, the alkyl substituted polysaccharide polyurethane composition comprises:

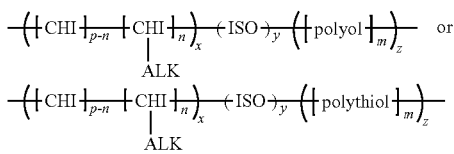

wherein CHI is a chitosan compound and ALK is an alkyl group having from 1-20 carbons, ISO=an isocyanate, p=the number of monomeric units in the polysaccharide and n=the number of monomeric units modified with ALK, m=the number of monomeric units of polyol or polythiol, x=the moles of polysaccharide used to produce the composition, y=the moles of isocyanate used to produce the composition and z=the moles of polyol or polythiol used to produce the composition. In this aspect, the p and n values range from about 5 to about 650 and m ranges from about 5 to about 10,000. In another aspect, the molar ratios of x and z range from 0.001 to 1 and y=1.

As another embodiment of the present invention, an alkyl substituted-catechol substituted polysaccharide polyurethane composition is provided.

In this embodiment, the alkyl substituted-catechol substituted polysaccharide polyurethane composition comprises:

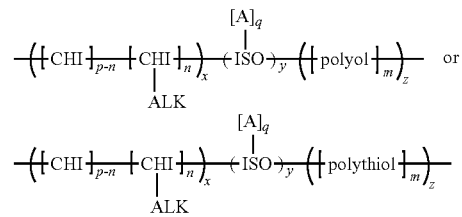

wherein CHI is a chitosan compound and ALK is an alkyl group having from 1-20 carbons, ISO=an isocyanate, A is a catechol, p=the number of monomeric units in the polysaccharide and n=the number of monomeric units modified with ALK, m=the number of monomeric units of polyol or polythiol, q=the moles of catechol used to produce the composition, x=the moles of polysaccharide used to produce the composition, y=the moles of isocyanate used to produce the composition and z=the moles of polyol or polythiol used to produce the composition. In an aspect, the p and n values range from about 5 to about 650 and m ranges from about 5 to about 10,000. In another aspect, the molar ratios of q, x and z range from 0.001 to 1 and y=1.

As another embodiment of the present invention, a sugar polyurethane composition is provided.

In this embodiment, the sugar polyurethane composition comprises:

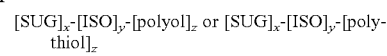

wherein SUG=a sugar, ISO=an isocyanate, and a polyol or polythiol; x=the moles of the sugar compound used to produce the composition, y=the moles of the isocyanate used to produce the composition and z=the moles of the polyol or polythiol used to produce the composition.

Besides the compositions, methods of making the compositions are also provided. For example, a method of producing a polyurethane composition capable of self-repair of mechanical damage to a substrate on which the composition has been applied is provided as an embodiment of the present invention. In this method of producing the polyurethane composition, a chitosan compound is contacted with an aldehyde to form an imine that is subsequently reduced to produce a product comprising:

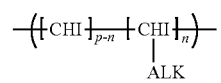

wherein CHI is a chitosan compound and ALK is an alkyl group having from 1-20 carbons, p=the number of monomeric units in the polysaccharide and n=the number of monomeric units modified with ALK. In an aspect, p and n each independently range from about 5 to about 650. The precursor product is then contacted with an isocyanate and a polyol or polythiol to produce the alkyl substituted polysaccharide polyurethane composition comprising:

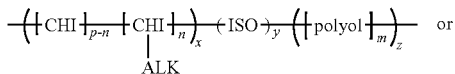

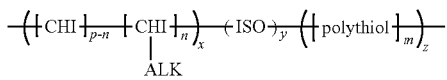

wherein CHI is a chitosan compound and ALK is an alkyl group having from 1-20 carbons, ISO=an isocyanate, p=the number of monomeric units in the polysaccharide and n=the number of monomeric units modified with ALK, m=the number of monomeric units of polyol or polythiol, x=the moles of polysaccharide used to produce the composition, y=the moles of isocyanate used to produce the composition and z=the moles of polyol or polythiol used to produce the composition. In an aspect, the p and n values range from about 5 to about 650, m ranges from about 5 to about 10,000. In another aspect, the molar ratios of x and z range from 0.001 to 1 and y=1.

In another example the precursor product is contacted with an isocyanate, a polyol or polythiol and a catechol to produce the alkyl substituted-catechol substituted polysaccharide polyurethane composition comprising:

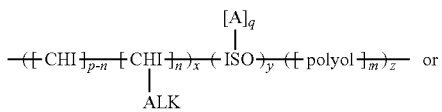

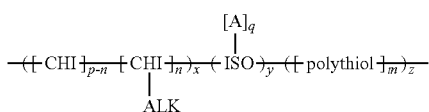

wherein CHI is a chitosan compound and ALK is an alkyl group having from 1-20 carbons, ISO=an isocyanate, A is a catechol, p=the number of monomeric units in the polysaccharide and n=the number of monomeric units modified with ALK, m=the number of monomeric units of polyol or polythiol, q=the moles of catechol used to produce the composition, x=the moles of polysaccharide used to produce the composition, y=the moles of isocyanate used to produce the composition and z=the moles of polyol or polythiol used to produce the composition. In an aspect, the p and n values range from about 5 to about 650 and m ranges from about 5 to about 10,000. In another aspect the molar ratios of q, x and z range from 0.001 to 1 and y=1.

In another example, a method of producing a polyurethane composition capable of self-repair of mechanical damage to a substrate on which the composition has been applied is provided as an embodiment of the present invention. In this method of producing the polyurethane composition, a sugar compound is contacted with an isocyanate and a polyol or a polythiol to form a product comprising:

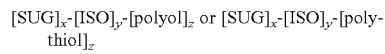

wherein SUG=a sugar, ISO=an isocyanate, and a polyol or polythiol; x=the moles of the sugar compound used to produce the composition, y=the moles of the isocyanate used to produce the composition and z=the moles of the polyol or polythiol used to produce the composition.

As another embodiment of the present invention, a method of repairing mechanical damage to a substrate is provided. In this embodiment, an alkyl substituted polysaccharide polyurethane composition is applied to a substrate. One such alkyl substituted polysaccharide polyurethane composition comprises:

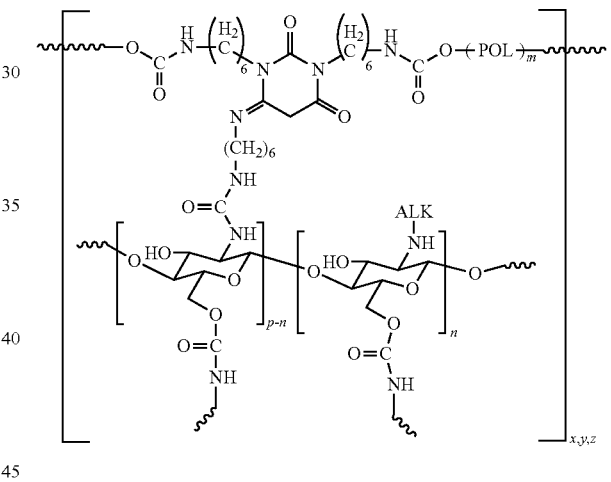

wherein POL=a polyol or a polythiol, ALK is an alkyl group having 1 to 20 carbons, p=the number of monomeric units in polysaccharide, n=the number of monomeric units modified with ALK, m=the number of monomeric units of polyol or polythiol, x=the moles of polysaccharide used to produce the composition, y=the moles of isocyanate used to produce the composition and z=the moles of polyol or polythiol used to produce the composition. In an aspect, x and z range from 0.001 to 1 and y=1.

In some embodiments, once the composition described herein is applied to the substrate, the substrate is exposed to ultraviolet light to initiate self-repair of mechanical damage to the substrate.

As another embodiment of the present invention, a method of repairing corrosive or mechanical damage to a substrate is provided. In this embodiment, an alkyl substituted-catechol substituted polysaccharide polyurethane composition is applied to a substrate. One such alkyl substituted-catechol substituted polysaccharide polyurethane composition comprises:

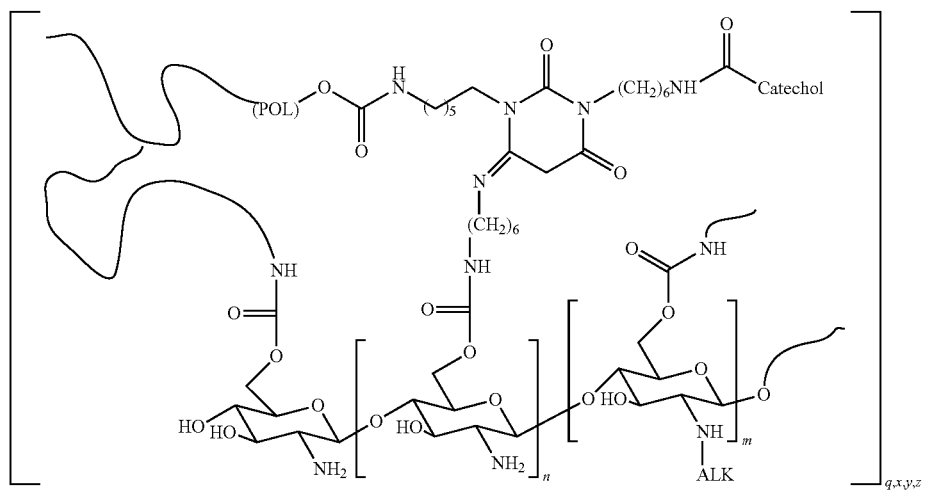

wherein ALK is an alkyl group having from 1-20 carbons, n=the number of monomeric units in the polysaccharide and m=the number of monomeric units modified with ALK, q=the moles of catechol used to produce the composition, x=the moles of polysaccharide used to produce the composition, y=the moles of isocyanate used to produce the composition and z=the moles of polyol or polythiol used to produce the composition. In an aspect, the molar ratios of q, x and z range from 0.001 to 1 and y=1.

Once the coating described herein is applied to the substrate, the coating is exposed to a ferric ion source and/or an ultraviolet source to initiate self-repair of corrosion or mechanical damage to the substrate.

As another embodiment of the present invention, a further method of repairing mechanical damage to a substrate is provided. In this embodiment, a sugar polyurethane composition is applied to a substrate. One such sugar polyurethane composition comprises:

$[SUG]_x\text{-}[ISO]_y\text{-}[polyol]_z$  or  $[SUG]_x\text{-}[ISO]_y\text{-}[polythiol]_z$ wherein SUG=a sugar, ISO=an isocyanate, and a polyol or polythiol; x=the moles of the sugar compound used to produce the composition, y=the moles of the isocyanate used to produce the composition and z=the moles of the polyol or polythiol used to produce the composition.

Once the composition described herein is applied to the substrate, the substrate is exposed to mechanical damage and treatment with a carbon dioxide-water source initiates self-repair of damage to the substrate.

BRIEF DESCRIPTION OF THE FIGURES

FIG. 1 is a schematic illustrating the synthetic steps involved in the formation of

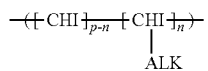

illustrating the reaction of chitosan with dodecyl aldehyde followed by sodium cyanoborohydride leading to the formation of

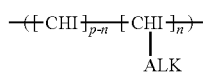

precursor and the reactions of

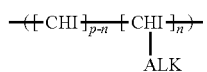

with an isocyanate and a polyol or polythiol leading to the formation of remendable alkyl substituted polysaccharide polyurethane compositions in accordance with the embodiments of the present invention.

Figure 2:
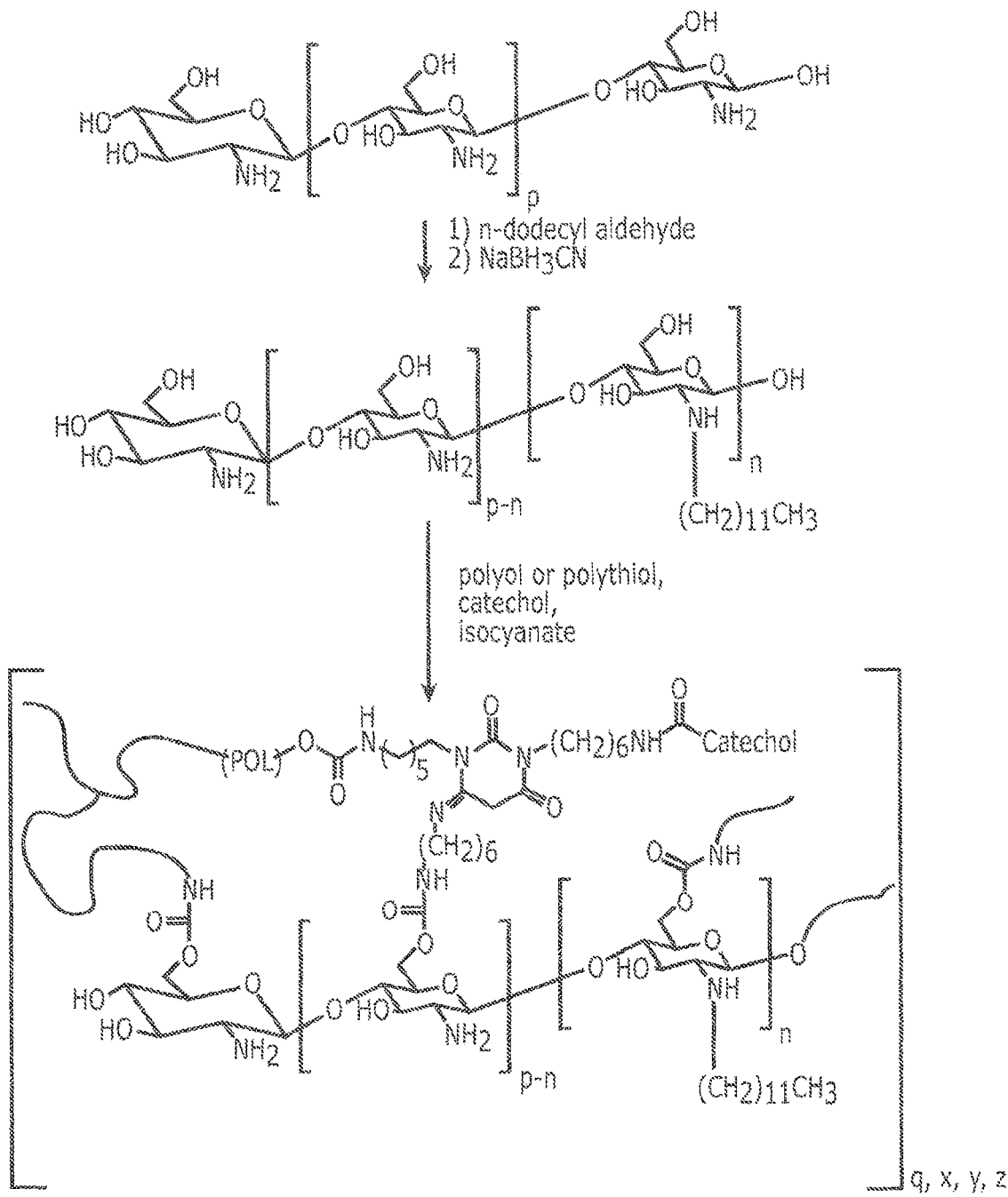
Figure 5A:
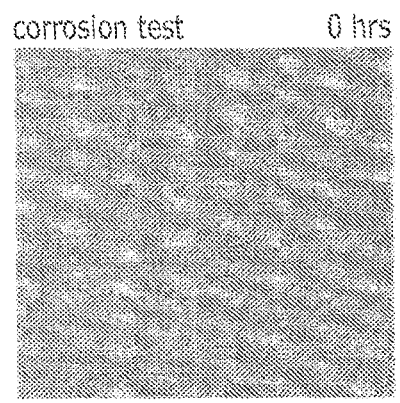
Figure 5B:
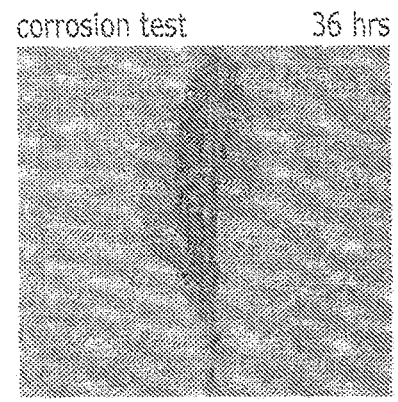
Figure 5C:
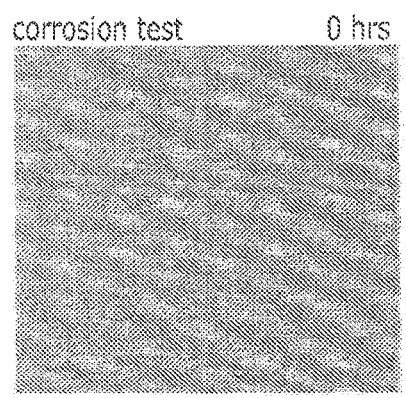
Figure 5D:
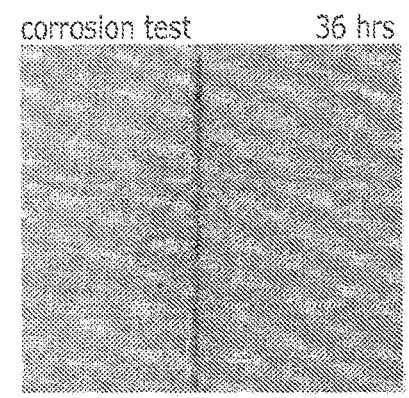
Figure 7A:
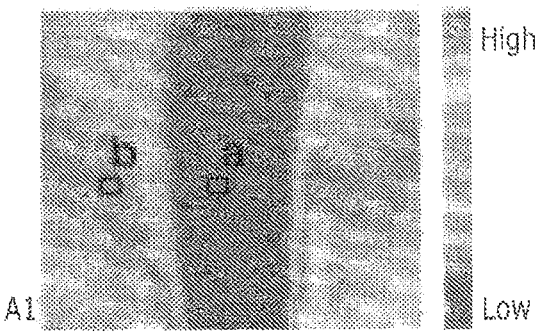
Figure 7B:
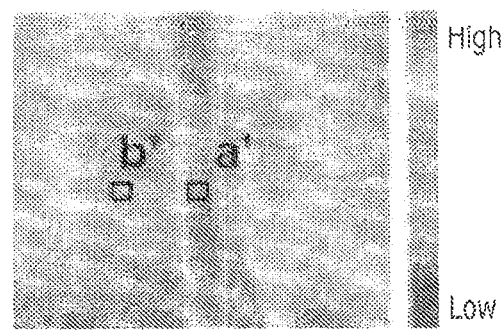
Figure 7C:
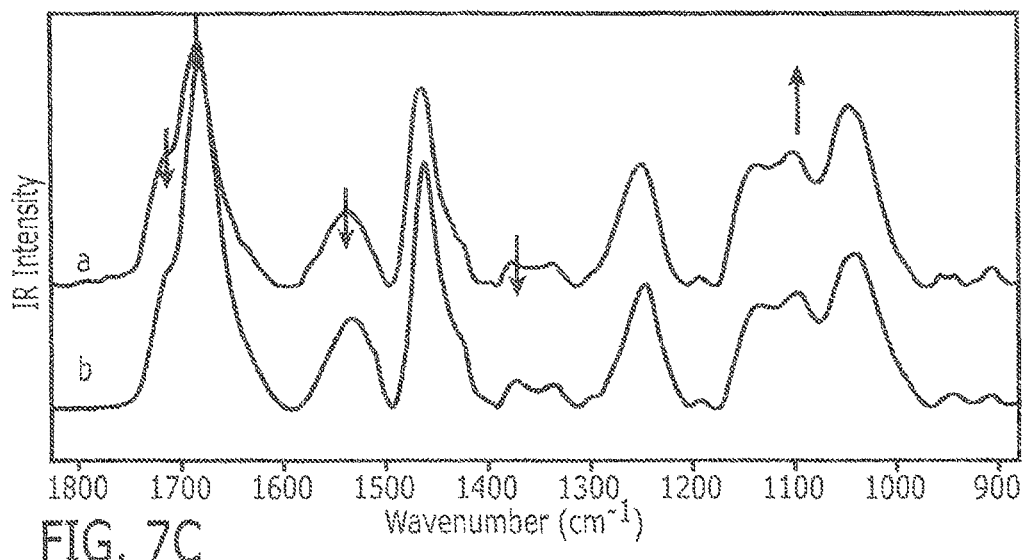
Figure 7D:
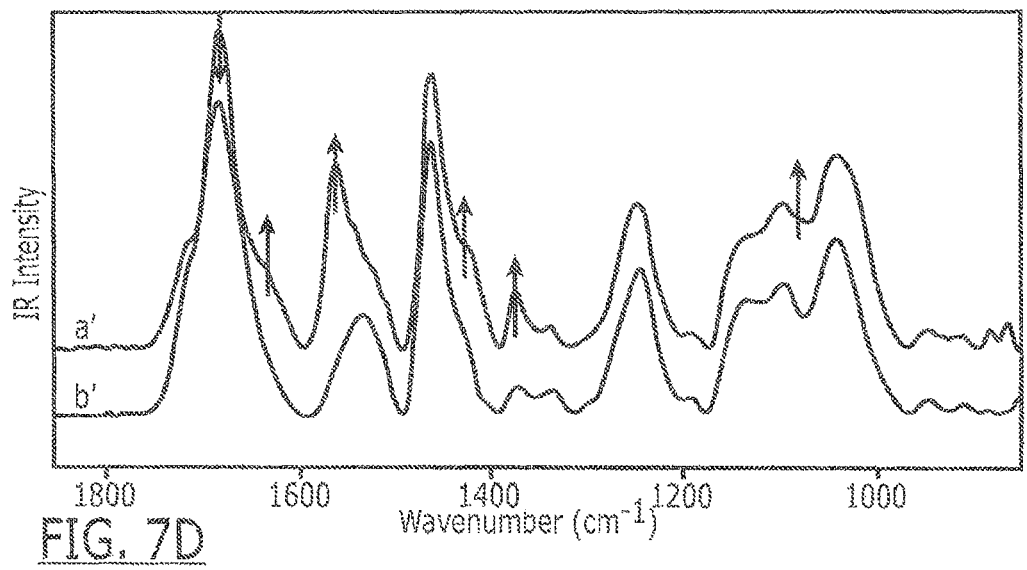
Figure 8A:
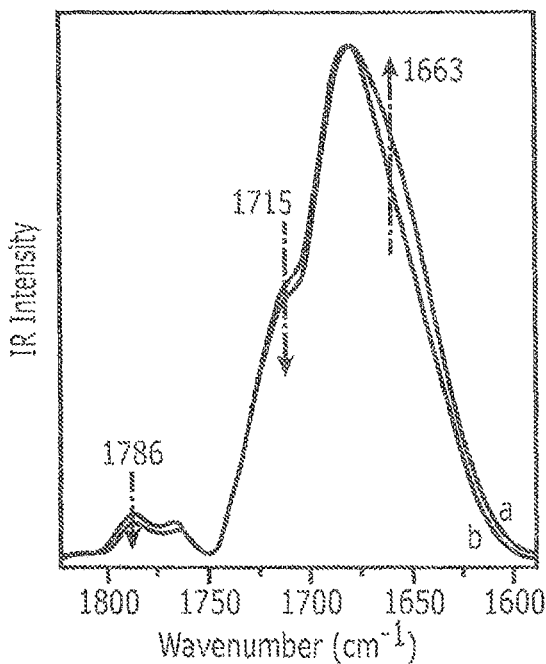
Figure 8B:
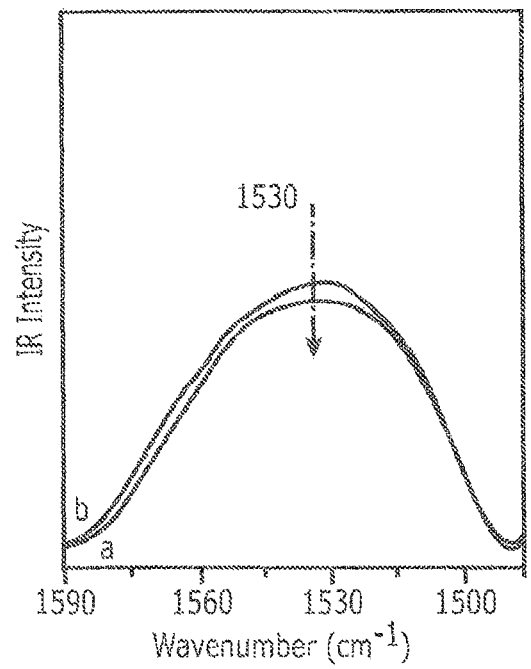
Figure 8C:
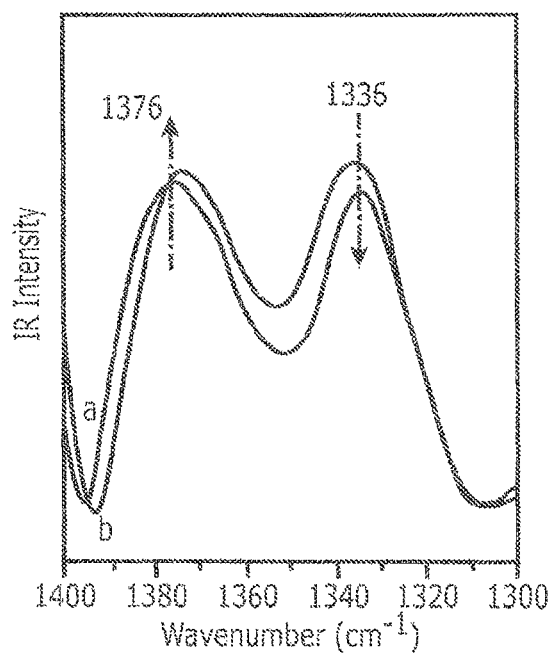
Figure 8D:
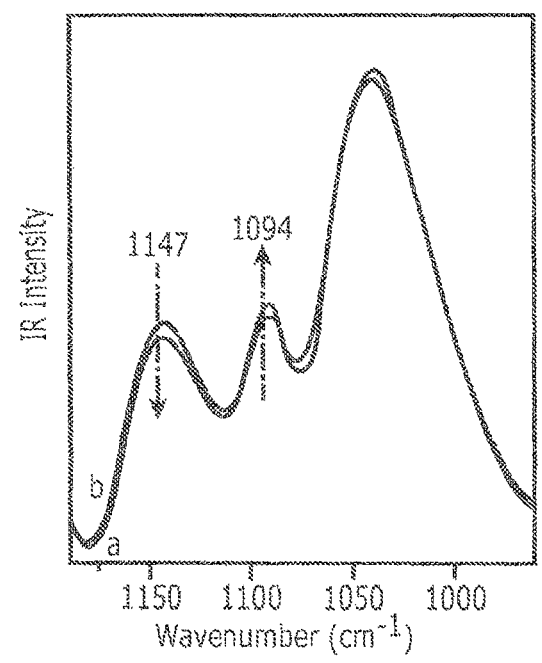

FIG. 2 is a schematic illustrating the synthetic steps involved in the formation of

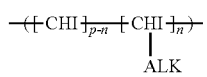

illustrating the reaction of chitosan with dodecyl aldehyde followed by sodium cyanoborohydride leading to the formation of

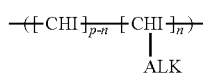

precursor and the reactions of

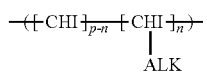

with an isocyanate, a polyol or polythiol and a catechol leading to formations of remendable alkyl substituted-catechol substituted polysaccharide polyurethane compositions in accordance with the embodiments of the present invention.

FIG. 3 is a schematic illustrating the synthetic step involved in the formation of $[SUG]_x$-$[TH]_y$-$[polyol]_z$ or $[SUG]_x$-$[TH]_y$-$[polythiol]_z$ compositions in accordance with the embodiments of the present invention.

FIG. 4 is a graphical illustration showing mechanical damage to an alkyl substituted-catechol substituted polysaccharide polyurethane composition followed by repair after exposure to ultraviolet light for 30 minutes.

FIG. 5: B1 is a graphical illustration showing the time zero point in an experiment where an alkyl substituted polysaccharide polyurethane composition is corrosion tested for 36 hours. The alkyl substituted polysaccharide polyurethane demonstrated no self repair, See, B1'. In FIG. 5 B2 an alkyl substituted polysaccharide catechol polyurethane composition is corrosion tested for 36 hours and leads to repair in accordance with embodiments of the present invention.

FIG. 6: Upon mechanical damage, a sugar polyurethane exhibits self-healing properties in the air, See, A. When the sugar polyurethane was exposed to $N_2$, See, B, $O_2$, See, C, $CO_2$, See, D, and $H_2O$ (8% RH in $N_2$), See E, all for 20 min, the sugar polyurethane composition did not exhibit self-healing attributes. In F—the sugar polyurethane composition exhibited self-healing properties in the presence of $CO_2$ and $H_2O$ (8% RH) after 20 min. As a control, in G—a PEG-isocyanate polyurethane did not exhibit self-healing attributes in the air. No external sources of energy were utilized. The experiments were carried out at 25° C.

FIG. 7: A1. IRIRI image of the 1562 $cm^{-1}$ band due to amide II vibration of polyurethane within the sugar polyurethane film immediately after damage; A2—IRIRI image of the 1562 $cm^{-1}$ band due to amide II vibration of polyurethane within the sugar polyurethane film after 20 min exposure to $CO_2$ and $H_2O$; B—IR spectra recorded from the areas a and b of image A1; C—IR spectra recorded from the areas a' and b' of image A2 (arrows indicate IR band intensity changes between areas a/a' and b/b'.)

FIG. 8: ATR-FTIR spectra of the sugar polyurethane model network (crosslinked without PEG) inside the damage (b) and outside the damage (a). The network was damaged under $N_2$ atmosphere to exclude possible immediate reaction between damaged species and $CO_2$/$H_2O$ from air.

Figure 9:
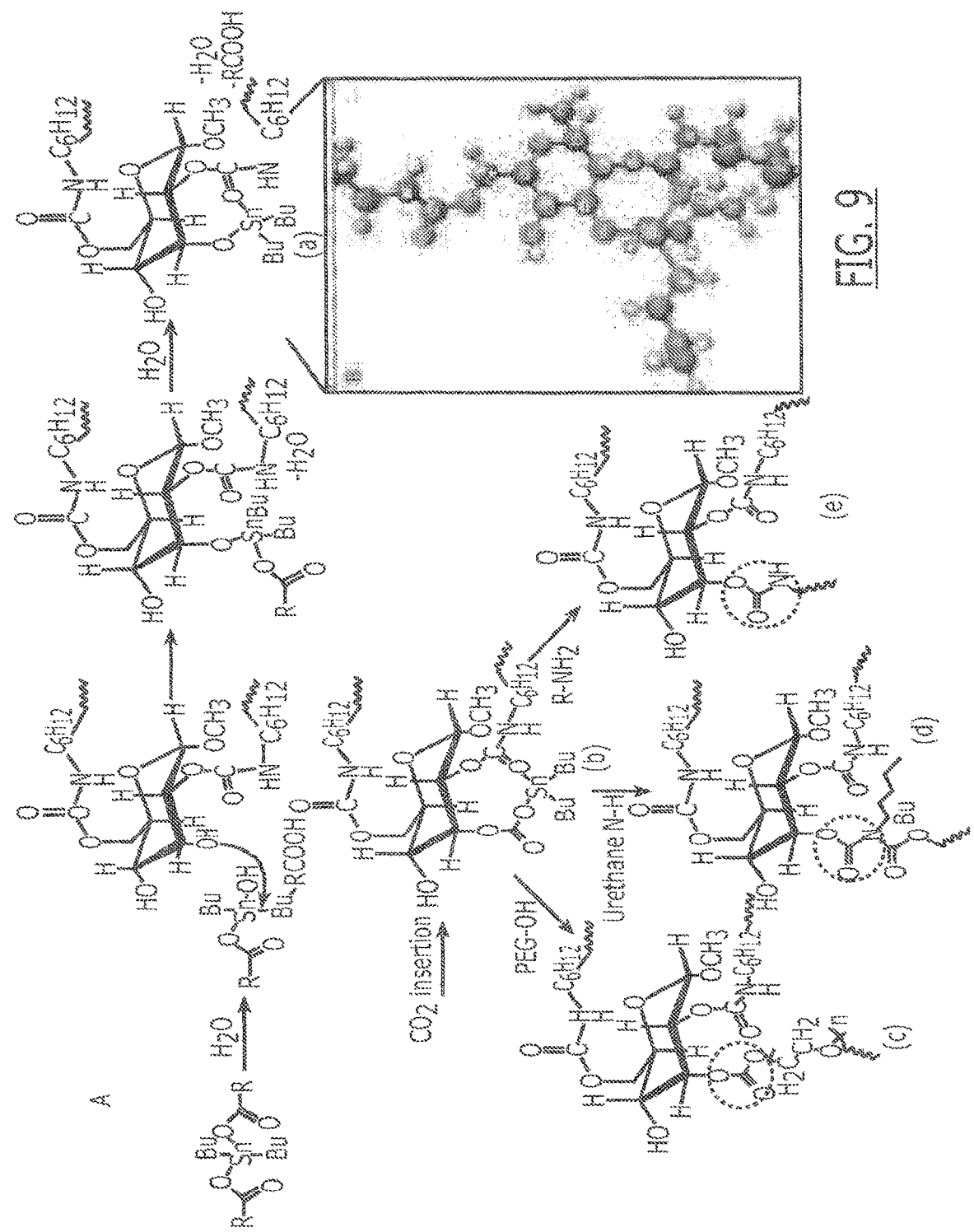

FIG. 9 presents in A) Mechanisms leading to the formation of carbonate and biurethane linkages; and B—Optimized molecular structure of MGP-urethane, Sn, and CO2 complex.

DETAILED DESCRIPTION

The present invention now will be described hereinafter with reference to the accompanying drawings and examples, in which embodiments of the invention are shown. This description is not intended to be a detailed catalog of all the different ways in which the invention may be implemented, or all the features that may be added to the instant invention. For example, features illustrated with respect to one embodiment may be incorporated into other embodiments, and features illustrated with respect to a particular embodiment may be deleted from that embodiment. Thus, the invention contemplates that in some embodiments of the invention, any feature or combination of features set forth herein can be excluded or omitted. In addition, numerous variations and additions to the various embodiments suggested herein will be apparent to those skilled in the art in light of the instant disclosure, which do not depart from the instant invention. Hence, the following descriptions are intended to illustrate some particular embodiments of the invention, and not to exhaustively specify all permutations, combinations and variations thereof.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

All publications, patent applications, patents and other references cited herein are incorporated by reference in their entireties for the teachings relevant to the sentence and/or paragraph in which the reference is presented.

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a composition comprises components A, B and C, it is specifically intended that any of A, B or C, or a combination thereof, can be omitted and disclaimed singularly or in any combination.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

The term "about" as used herein when referring to a measurable value such as a dosage or time period and the like, is meant to encompass variations of ±20%, ±10%, ±5%, ±1%, ±0.5%, or even ±0.1% of the specified amount.

The terms "comprise," "comprises" and "comprising" as used herein, specify the presence of the stated features, integers, steps, operations, elements, and/or components, but do not preclude the presence or addition of one or more other features, integers, steps, operations, elements, components, and/or groups thereof.

As used herein, the transitional phrase "consisting essentially of" means that the scope of a claim is to be interpreted to encompass the specified materials or steps recited in the claim and those that do not materially affect the basic and novel characteristic(s) of the claimed invention. Thus, the term "consisting essentially of" when used in a claim of this invention is not intended to be interpreted to be equivalent to "comprising."

Compounds useful as compositions in accordance with the present disclosure include those described generally above and below, and are further illustrated by the embodiments, sub-embodiments, and species described herein. As used herein, the following definitions shall apply unless otherwise indicated.

"Alcohol," as used herein, refers to an organic compound having an —OH functional group. Examples include, but are not limited to, methanol, ethanol, propanol, butanol, pentanol and hexanol.

"Aldehyde," as used herein, refers to an organic compound having a —CHO functional group. Examples include, but are not limited to, formaldehyde, benzaldehyde, cyclohexanecarboxaldehyde and dodecanal.

"Alkyl" or "alkyl group," as used herein, refers to a straight or branched chain hydrocarbon containing from 1 or 2 to 10 or 20 or more carbon atoms (e.g., $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, etc.). Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, n-decyl, n-dodecyl and the like.

"Catechol," as used herein, refers to a compound comprising 1,2-dihydroxybenzene and is represented by the structure,

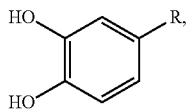

wherein R=$CH_2CH(NH_2)COOH$, $(CH_2)_2NH_2$, $CH_2CH(NH_2)CH_3$, $CH(OH)CH_2NH_2$, $CH_2C(CH_3)(NH_2)COOH$, $CH(OH)CH(NH_2)COOH$, $CH(OH)CH_2NHCH_3$, or $CH_2OH$. In addition, catechols include, but are not limited to, (+)-2(a)-amino-3(a)-3,4-dihydroxyphenyl-trans-decalin, (+)-2(a)-amino-3 (e)-3,4-dihydroxyphenyl-trans-decalin, (+)-2(e)-amino-3(a)-3,4-dihydroxyphenyl-trans-decalin, and (+)-2(e)-amino-3(e)-3,4-dihydroxyphenyl-trans-decalin.

"Composite," as used herein, refers to a solid material which is composed of two or more substances having different physical characteristics and in which each substance retains its identity while contributing desirable properties to the whole. Examples include, but are not limited to, glass fibers, glass fiber reinforced plastic, tungsten carbide, carbon fibers, carbon fiber reinforced plastics, brick and concrete.

"Corrosion inhibition," as used herein, refers to inhibiting a process in which a solid, especially a metal, is irreversibly damaged and changed by a chemical action, as in the oxidation of iron in the presence of water and oxygen by an electrolytic process.

"Diol," as used herein, refers to an organic compound having two —OH functional groups. Examples include, but are not limited to, ethylene glycol, diethylene glycol, triethylene glycol, tetraethylene glycol, polyethylene glycol, propylene glycol, dipropylene glycol, tripropylene glycol, polypropylene glycol, 1,3-propandiol, 1,3-butanediol, 1,4-butanediol, 1,6-hexanediol, 1,4-cyclohexanedimethanol, neopentyl glycol and polyesterdiol.

"Dithiol," as used herein, refers to an organic compound having two —SH functional groups. Examples include, but are not limited to, 1,2-ethanedithiol, 1,3-propanedithiol, 1,4-butanedithiol, 2,3-butanedithiol, 1,5-pentanedithiol, benzene-1,4-dithiol, 2,2'-(ethylenedioxy)diethanethiol, 1,6-hexanedithiol, tetra(ethylene glycol) dithiol, 1,8-octanedithiol, 1,9-nonanedithiol, 1,11-undecanedithiol, 5,5'-bis(mercaptomethyl)-2,2'-bipyridine, hexa(ethylene glycol) dithiol, and 1,16-hexadecanedithiol.

"Hydroxy" or "hydroxyl," as used herein, refers to an —OH functional group.

"Isocyanate," as used herein, refers to an organic compound having three —NCO functional groups. Examples include, but are not limited to, (E)-3,5-bis(6-isocyanatohexyl)-6-((6-isocyanatohexyl)imino)-1,3,5-oxadiazinane-2,4-dione, (Z)-3,5-bis(6-isocyanatohexyl)-6-((6-isocyanatohexyl)imino)-1,3,5-oxadiazinane-2,4-dione, 3,5-bis(6-isocyanatohexyl)-6-((6-isocyanatohexyl)imino)-1,3,5-oxadiazinane-2,4-dione, and Desmodur compounds, such as Desmodur® N3900a, that are commercially available, for example, from Bayer Material Science, or mixtures thereof.

A "monosaccharide" as used herein is simple sugar or carbohydrate, CHO, not decomposable by hydrolysis. Examples of monosaccharides include glucose, fructose, and galactose.

An "organic" compound as used herein is a compound that contains carbon.

"Organic solvent" is a compound containing carbon that is useful as a solvent. Examples of organic solvents include, but are not limited to, acid amides such as N,N-dimethylformamide and N,N-dimethylacetamide; alcohols such as ethanol, methanol, isopropanol, amyl alcohol, ethylene glycol, propylene glycol, 1-butanol, butyl carbitol acetate and glycerin; aliphatic hydrocarbons such as hexane and octane; aromatic hydrocarbons such as toluene, xylenes, benzene and naphtha 100; ketones such as acetone, methyl ethyl ketone and cyclohexanone; halogenated hydrocarbons such as methylene chloride, chlorobenzene and chloroform; esters such as ethyl acetate, amyl acetate and butyl acetate; ethers such as tetrahydrofuran, 2-methyltetrahydrofuran, 1,4-dioxane, tert-butyl methyl ether, diethyl ether and ethylene glycol dimethyl ether; nitriles such as acetonitrile; and sulfoxides such as dimethylsulfoxide.

"Organotin compound," as used herein, refers to tin compounds comprising compounds represented by the structure,

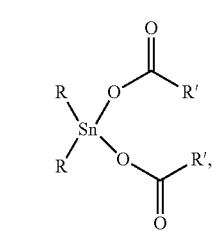

wherein R=$C_{1-8}$ alkyl and R'=$C_{6-16}$ alkyl.

"Polymer," as used herein, refers to any of a class of natural or synthetic substances composed of macromolecules that are multiples of monomers. The monomers need not all be the same or have the same structure. Polymers may consist of long chains of unbranched or branched monomers or may be cross-linked networks of monomers in two or three dimensions. Their backbones may be flexible or rigid. Examples of polymers include, but are not limited to, cellulose, lignin, rubber, proteins, nucleic acids, plastics including polyethylene, the nylons, polyurethanes, polyesters, vinyls (e.g., PVC) and synthetic rubbers.

"Polysaccharide," as used herein, refers to any of a class of carbohydrates, such as starch, cellulose, chitin, chitosan, pectin and heparin, consisting of a number of monosaccharides joined by glycosidic bonds. In particular embodiments, the polysaccharide is a natural polysaccharide.

"Polyol," as used herein, refers to any organic compound comprising two of more hydroxy functional groups.

"Polythiol," as used herein, refers to any organic compound comprising two of more thiol functional groups.

A "reducing agent" is an agent that reduces a compound, whereby the compound gains electrons or decreases its oxidation state. A "hydride reducing agent" is a reducing agent comprising a hydride. Examples include, but are not limited to, sodium borohydride, sodium cyanoborohydride, lithium borohydride, lithium aluminum hydride, lithium tri-butoxyaluminum hydride, diisobutylaluminum hydride (DIBAH) and zinc borohydride.

"Sugar," as used herein, refers to polyhydroxyaldehydes or ketones and derivatives thereof. Examples include, but are not limited to monosaccharides, disaccharides, methyl pyranosides and methyl furanosides. Examples of methyl pyranosides include, but are not limited to, methyl alpha-D-glucopyranoside, methyl beta-D-glucopyranoside, methyl alpha-D-galactopyranoside, and methyl beta-D-galactopyranoside.

"Tetrathiol," as used herein, refers to an organic compound having four —SH functional groups. Examples include, but are not limited to, pentaerythritol tetrakis(3-mercaptopropionate).

"Thiol," as used herein, refers to an organic compound having a —SH functional group.

"Triol," as used herein, refers to an organic compound having three —OH functional groups. Examples include, but are not limited to, glycerol.

"Trithiol," as used herein, refers to an organic compound having three —SH functional groups.

Unless otherwise stated, structures depicted herein are also meant to include all enantiomeric, diastereomeric, and geometric (or conformational) forms of the structure; for example, the R and S configurations for each asymmetric center, (Z) and (E) double bond isomers, and (Z) and (E) conformational isomers. Therefore, single stereochemical isomers as well as enantiomeric, diastereomeric, and geometric (or conformational) mixtures of the present compounds are within the scope of the invention. Unless otherwise stated, all tautomeric forms of the compounds of the invention are within the scope of the invention.

In some embodiments, alkyl groups as described herein are optionally substituted (e.g., from 1 to 3 or 4 times) with independently selected, but not limited to, acyl, alkyl, alkenyl, alkoxy, alkynyl, amidino, amino, amino acid, amide, aryl, azido, carbonate, carbonyl, carboxy, cyano, cycloalkyl, ester, formyl, halo, heterocyclo, heteroaryl, hydroxy, nitro, oxo, oxy, peptide, sulfone, sulfoxide, and thiol.

Provided herein are compositions for repairing damage to a substrate upon exposure of the substrate to either an ultraviolet light, a ferric ion or carbon dioxide-water source. Illustrative embodiments of the invention are described below as they might be employed in the reactions and compositions related to polymers. In the interest of clarity, not all features of an actual implementation are described in this specification. It will of course be appreciated that in the development of any such actual embodiment, numerous implementation-specific decisions must be made to achieve the developers' specific goals, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments of the invention will become apparent from consideration of the following description.

It would be advantageous for the polymers to be useful as coatings, so that the coating would be able to mend itself. It would also be advantageous if the repair could occur when the coating is simply exposed to ambient conditions, such as ultraviolet exposure from the sun. It would be advantageous if the repair could occur when the coating is exposed to ferric ion to minimize corrosion. It would also be advantageous if the repair could occur when the coating is exposed to a carbon dioxide-water source.

Polymeric compositions, such as polyurethane compositions, and related methods are provided as embodiments of the present invention. Methods of making the compositions are provided. Methods of using the compositions are also provided.

More specifically, polyurethane compositions are provided as embodiments of the present invention that exhibit self-repairing properties upon exposure to an ultraviolet light, ferric ion or a carbon dioxide-water source. The alkyl substituted polysaccharide polyurethane compositions include an alkyl substituted chitosan precursor. Upon exposure of the alkyl substituted polysaccharide polyurethane to ultraviolet light, self-repair takes place.

In another example, the alkyl substituted-catechol substituted polysaccharide polyurethane compositions include an alkyl substituted chitosan precursor. Upon exposure of the alkyl substituted-catechol substituted polysaccharide polyurethane to a ferric ion source; catechol coordinates with the ferric ion source thus repairing the corrosive damage. The alkyl substituted-catechol substituted polysaccharide polyurethane compositions are capable of repairing themselves in less than about a thirty-six hour period and can be used in many coatings applications ranging from the aerospace, chemical, electrical, furniture, transportation, packaging, cosmetics, fashion, optical and biomedical industries. In another aspect, the alkyl substituted-catechol substituted polysaccharide polyurethane compositions exposed to ultraviolet light are able to self-repair. The methods and compositions made in accordance with embodiments of the present invention can also be used in various other industries, as will be apparent to those of skill in the art and are to be considered within the scope of the present invention.

In addition, sugar polyurethane compositions are provided as embodiments of the present invention that exhibit self-repairing properties upon exposure to a carbon dioxide-water source. Upon exposure of the sugar polyurethane to mechanical damage, a carbon dioxide-water source initiates repair of the sugar polyurethane. The produced materials are capable of repairing themselves in less than about a thirty minute period and can be used in many coatings applications ranging from the aerospace, chemical, electrical, furniture, transportation, packaging, cosmetics, fashion, optical and biomedical industries. The methods and compositions made in accordance with embodiments of the present invention can also be used in various other industries, as will be apparent to those of skill in the art and are to be considered within the scope of the present invention.

In an embodiment of the present invention, alkyl substituted polysaccharide polyurethane compositions are produced based on alkyl substituted derivatives of chitosan

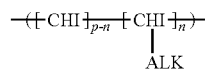

being reacted with an isocyanate and a polyol or polythiol to form alkyl substituted polysaccharide polyurethane compositions. Each of the components used to produce the alkyl substituted polysaccharide polyurethane compositions in the present invention may possess specification properties that serve specific functions. For example, alkyl substituted derivatives of chitosan and isocyanates generally provide desirable heterogeneity through polyurethane components. Chitosan is generally a product of deacetylation of chitin, which is the structural element of exoskeletons of crustaceans (crabs, shrimp, etc.) that occurs in abundance in nature.

For example, as an embodiment of the present invention, alkyl substituted polysaccharide polyurethane compositions are provided. In this embodiment, the alkyl substituted polysaccharide polyurethane composition comprises:

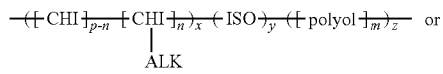

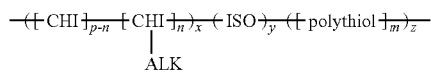

wherein CHI is a chitosan compound and ALK is an alkyl group having from 1-20 carbons, ISO=an isocyanate, p=the number of monomeric units in the polysaccharide and n=the number of monomeric units modified with ALK, m=the number of monomeric units of polyol or polythiol, x=the moles of polysaccharide used to produce the composition, y=the moles of isocyanate used to produce the composition and z=the moles of polyol or polythiol used to produce the composition. In an aspect, the p and n values range from about 5 to about 650, m ranges from about 5 to about 10,000. In another aspect, the molar ratios of x and z range from 0.001 to 1 and y=1.

Representative ALK reactants include, but are not limited to, n-dodecyl aldehyde.

The types of isocyanates used in embodiments of the present invention can be varied. For example, in an aspect, the isocyanate can include (E)-3,5-bis(6-isocyanatohexyl)-6-((6-isocyanatohexyl)imino)-1,3,5-oxadiazinane-2,4-dione. Other suitable types of isocyanates will be apparent to those of skill in the art and are to be considered within the scope of the present invention.

Besides varying the types of isocyanates used in compositions and methods described herein, the types of polyols used can also be varied. For example, the polyol can comprise diols, triols, tetraols, polyols, or combinations thereof. Other suitable types of polyols will be apparent to those of skill in the art and are to be considered within the scope of the present invention.

Similarly, in embodiments of the present invention that use polythiols, the types of polythiols used can be varied. For example, the polythiol can comprise dithiols, trithiols, tetrathiols, polythiols, or combinations thereof. Other suitable types of polythiols will be apparent to those of skill in the art and are to be considered within the scope of the present invention.

In an aspect, the composition comprises a structure as follows:

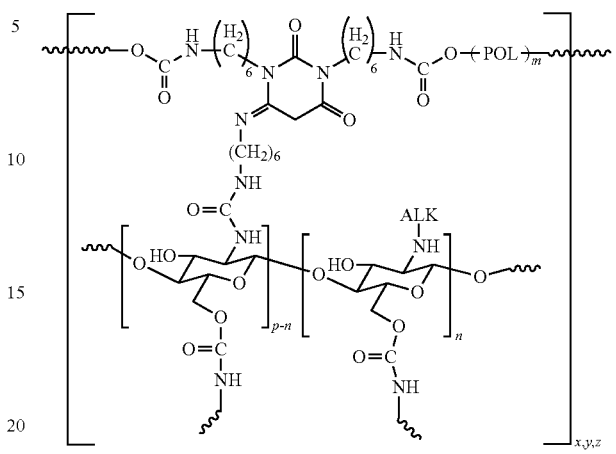

wherein POL=a polyol or a polythiol, alkyl is an alkyl group having 1 to 20 carbons; p=the number of monomeric units in the polysaccharide and n=the number of monomeric units modified with ALK, m=the number of monomeric units of polyol or polythiol, x=the moles of polysaccharide used to produce the composition, y=the moles of isocyanate used to produce the composition and z=the moles of polyol or polythiol used to produce the composition. In an aspect, the molar ratios of x and z range from 0.001 to 1 and y=1.

The compositions described herein are useful in a variety of applications. For example, the compositions described herein can be used in various types of coatings. The coatings can include the compositions described herein and such coatings applications can include, but are not limited to, those useful in the aerospace, chemical, electrical, furniture, transportation, packaging, cosmetics, fashion, optical and biomedical industries. In an aspect, the coatings can include the alkyl substituted polysaccharide polyurethane composition having a formula as follows:

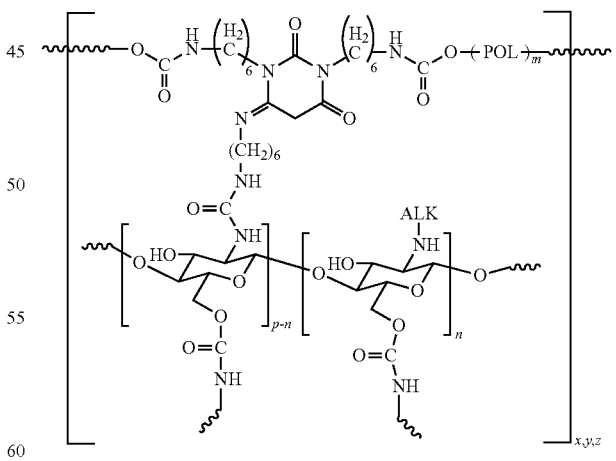

wherein POL=a polyol or a polythiol, alkyl is an alkyl group having 1 to 20 carbons; p=the number of monomeric units in the polysaccharide and n=the number of monomeric units modified with ALK, m=the number of monomeric units of polyol or polythiol, x=the moles of polysaccharide used to produce the composition, y=the moles of isocyanate used to produce the composition and z=the moles of polyol or polythiol used to produce the composition. In an aspect, the molar ratios of x and z range from 0.001 to 1 and y=1.

In another embodiment of the present invention, alkyl substituted-catechol substituted polysaccharide polyurethane compositions are produced based on alkyl substituted derivatives of chitosan

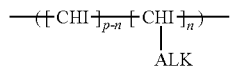

being reacted with an isocyanate, a polyol or polythiol and a catechol to form heterogeneous alkyl substituted-catechol substituted polysaccharide polyurethane compositions. Each of the components used to produce the alkyl substituted-catechol substituted polysaccharide polyurethane compositions in the present invention may possess specific properties that serve specific functions. For example, alkyl substituted derivatives of chitosan and isocyanates generally provide desirable heterogeneity through polyurethane components and the catechol provides an aryl diol moiety that can complex with ferric ion to reduce and/or stop corrosion.

For example, as an embodiment of the present invention, alkyl substituted-catechol substituted polysaccharide polyurethane compositions are provided. In this embodiment, the alkyl substituted-catechol substituted polysaccharide polyurethane composition comprises:

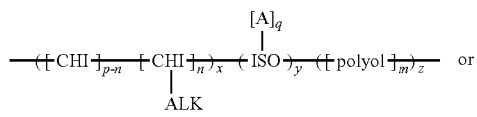

or

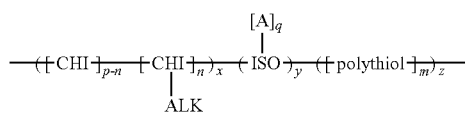

wherein CHI is a chitosan compound and ALK is an alkyl group having from 1-20 carbons, ISO=an isocyanate, A is a catechol, p=the number of monomeric units in the polysaccharide and n=the number of monomeric units modified with ALK, m=the number of monomeric units of polyol or polythiol, q=the moles of catechol used to produce the composition, x=the moles of polysaccharide used to produce the composition, y=the moles of isocyanate used to produce the composition and z=the moles of polyol or polythiol used to produce the composition. In an aspect, the molar ratios of q, x and z range from 0.001 to 1 and y=1.

Representative ALK reactants include, but are not limited to, n-dodecyl aldehyde.

The types of isocyanates used in embodiments of the present invention can be varied. For example, in an aspect, the isocyanate can include (E)-3,5-bis(6-isocyanatohexyl)-6-((6-isocyanatohexyl)imino)-1,3,5-oxadiazinane-2,4-dione. Other suitable types of isocyanates will be apparent to those of skill in the art and are to be considered within the scope of the present invention.

Besides varying the types of isocyanates used in compositions and methods described herein, the types of polyols used can also be varied. In an aspect, for example, the polyol can comprise diols, triols, tetraols, polyols, or combinations thereof. Other suitable types of polyols will be apparent to those of skill in the art and are to be considered within the scope of the present invention.

Similarly, in embodiments of the present invention that use polythiols, the types of polythiols used can be varied. For example, the polythiol can comprise dithiols, trithiols, tetrathiols, polythiols, or combinations thereof. Other suitable types of polythiols will be apparent to those of skill in the art and are to be considered within the scope of the present invention.

In an aspect, the composition comprises a structure as follows:

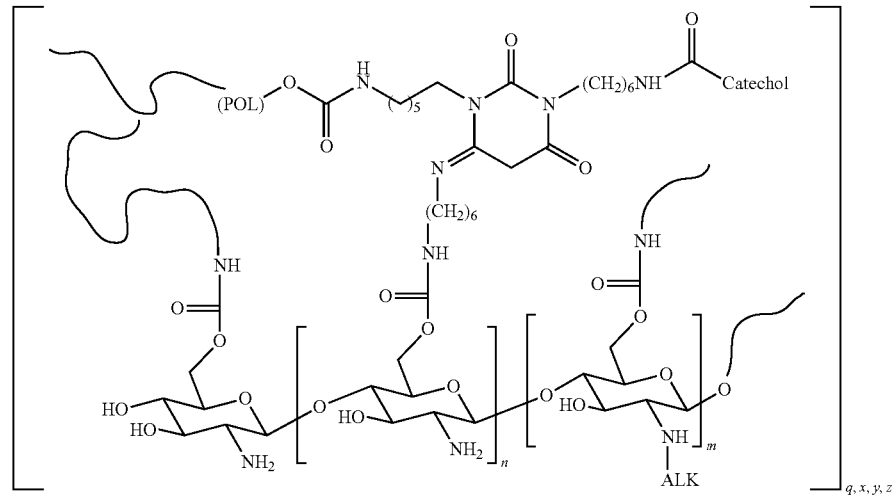

wherein ALK is an alkyl group having from 1-20 carbons, n=the number of monomeric units in the polysaccharide and m=the number of monomeric units modified with ALK, q=the moles of catechol used to produce the composition, x=the moles of polysaccharide used to produce the composition, y=the moles of isocyanate used to produce the composition and z=the moles of polyol or polythiol used to produce the composition. In an aspect, the molar ratios of q, x and z range from 0.001 to 1 and y=1.

The compositions described herein are useful in a variety of applications. For example, the compositions described herein can be used in various types of coatings. The coatings can include the compositions described herein. In an aspect, the coatings can include the alkyl substituted-catechol substituted polysaccharide polyurethane composition having a formula as follows:

In an aspect, the alkyl substituted chitosan composition comprises:

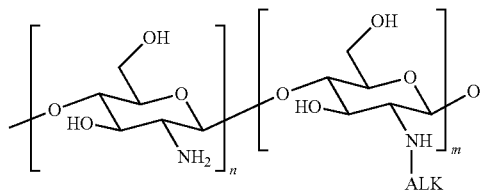

wherein n=the number of monomeric units in the polysaccharide and m=the number of monomeric units modified

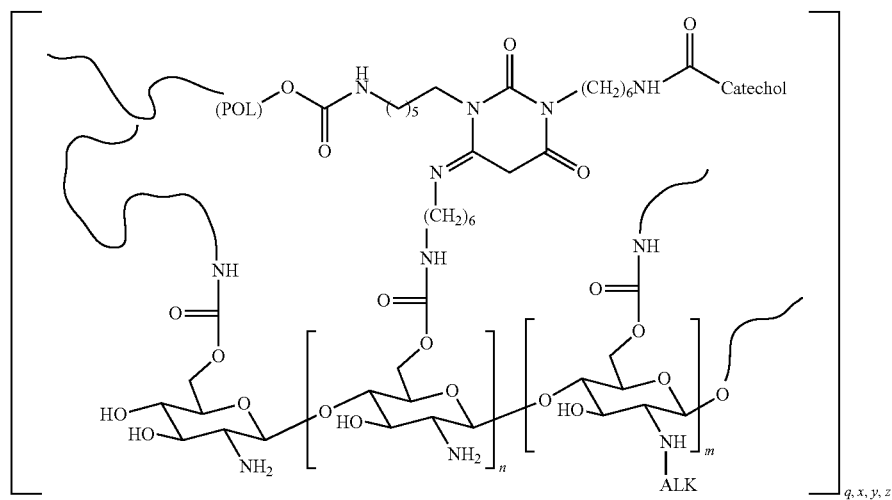

wherein ALK is an alkyl group having from 1-20 carbons, n=the number of monomeric units in the polysaccharide and m=the number of monomeric units modified with ALK, q=the moles of catechol used to produce the composition, x=the moles of polysaccharide used to produce the composition, y=the moles of isocyanate used to produce the composition and z=the moles of polyol or polythiol used to produce the composition. In an aspect, the molar rations of q, x and z range from 0.001 to 1 and y=1.

As another embodiment of the present invention, an alkyl substituted chitosan composition is provided. In this embodiment, the alkyl substituted chitosan composition comprises:

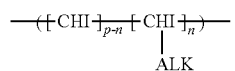

wherein CHI is a chitosan compound and ALK is an alkyl group having from 1-20 carbons, p=the number of monomeric units in the polysaccharide and n=the number of monomeric units modified with ALK. In an aspect, n and m each independently range from about 5 to about 650.

with ALK in the composition. In an aspect, n and m each independently range from about 5 to about 650.

Besides using chitosan, other natural polysaccharides, such as heparin, pectin or combinations thereof can be used. In an aspect, as an embodiment of the present invention, an alkyl substituted natural polysaccharide composition is provided.

The composition comprises:

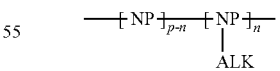

wherein NP is a natural polysaccharide compound, ALK is an alkyl group having from 1-20 carbons, p=the number of monomeric units in the polysaccharide and n=the number of monomeric units modified with ALK. In an aspect, p and n each independently range from about 5 to about 650. In an aspect, an alkyl natural polysaccharide composition can be reacted with a polyol or polythiol, and an isocyanate to produce an alkyl substituted natural polysaccharide polyurethane composition.

In another aspect, an alkyl natural polysaccharide composition can be reacted with a polyol or polythiol, an isocyanate and a catechol to produce an alkyl substituted-catechol substituted natural polysaccharide polyurethane composition. Other suitable types of natural polysaccharide compounds that can be used in embodiments of the present invention will be apparent to those of skill in the art and are to be considered within the scope of the present invention.

Besides using n-dodecyl aldehyde, other aldehydes can be used in embodiments of the present invention.

Besides using dopamine (including 4-(2-Aminoethyl) benzene-1,2-diol; 2-(3,4-Dihydroxyphenyl)ethylamine; 3,4-Dihydroxyphenethylamine and 3-hydroxytyramine), other catechols can be used in embodiments of the present invention and will be apparent to those of skill in the art and are to be considered within the scope of the present invention including, but not limited to, dopa, dopamine, alpha-methyldopamine, norepinephrine, alpha-methyldopa, droxidopa, epinephrine, and 4-hydroxymethylprocatechol.

As another embodiment of the present invention, a sugar polyurethane composition is provided. In this embodiment, the sugar polyurethane composition comprises:

[SUG]$_x$-[ISO]$_y$-[polyol]$_z$  or  [SUG]$_x$-[ISO]$_y$-[polythiol]$_z$ wherein SUG=a sugar, ISO=an isocyanate, and a polyol or polythiol; x=the moles of the sugar compound used to produce the composition, y=the moles of the isocyanate used to produce the composition and z=the moles of the polyol or polythiol used to produce the composition.

Besides the compositions, methods of making the compositions are also provided as embodiments of the present invention. For example, a method of producing a polyurethane composition capable of self-repair of mechanical damage and or corrosive damage to a substrate on which the composition has been applied is provided as an embodiment of the present invention. In this method of producing the polyurethane composition, a chitosan compound is contacted with an aldehyde to form an imine that is subsequently reduced to produce a product comprising:

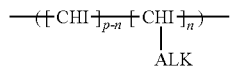

wherein CHI is a chitosan compound and ALK is an alkyl group having from 1-20 carbons, p=the number of monomeric units in the polysaccharide and n=the number of monomeric units modified with ALK. In an aspect, p and n each independently range from about 5 to about 650.

In one embodiment, the precursor product is then contacted with an isocyanate, and a polyol or polythiol to produce the alkyl substituted polysaccharide polyurethane composition comprising:

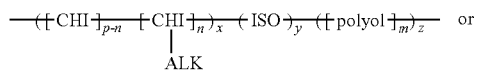

-continued
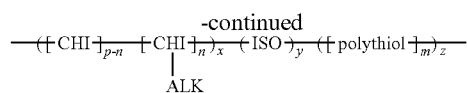

wherein CHI is a chitosan compound and ALK is an alkyl group having from 1-20 carbons, ISO=an isocyanate, p=the number of monomeric units in the polysaccharide and n=the number of monomeric units modified with ALK, m=the number of monomeric units of polyol or polythiol, x=the moles of polysaccharide used to produce the composition, y=the moles of isocyanate used to produce the composition and z=the moles of polyol or polythiol used to produce the composition. In an aspect, the p and n values range from about 5 to about 650, m ranges from about 5 to about 10,000. In another aspect, the molar ratios of x and z range from 0.001 to 1 and y=1.

In another embodiment, the precursor product is then contacted with an isocyanate, a polyol or polythiol and optionally an organotin compound to produce the alkyl substituted polysaccharide polyurethane composition.

In an aspect of the methods described herein, when the chitosan compound contacts the aldehyde compound, the step typically occurs in the presence of an organic solvent as described herein. Organic solvents having been described herein where any organic solvent that is compatible with the components used in the methods and compositions described herein can be used, as will be understood by those skilled in the art. A reducing agent next contacts the imine intermediate to reduce the imine double bond to produce an alkylated amine. Any reducing agent that is compatible with the components used in the methods and compositions described herein can be used, as will be understood by those skilled in the art. In an aspect, the reducing agent is sodium cyanoborohydride or sodium borohydride. In an aspect of the methods described herein, alkyl substituted chitosan contacts a polyol or polythiol and isocyanate to produce the composition, the step typically occurs in the presence of an organic solvent. Any organic solvent that is compatible with the components used in the methods and compositions described herein can be used, as will be understood by those skilled in the art. In another aspect of the methods described herein, alkyl substituted chitosan contacts a polyol or polythiol and isocyanate to produce the composition, the step typically occurs in the presence of an organic solvent and optionally in the presence of an organotin compound. Any organic solvent that is compatible with the components used in the methods and compositions described herein can be used, as will be understood by those skilled in the art. In an aspect the molar ratio of isocyanate/PEG/alkyl chitosan composition=1 to 0.9 to 0.1. In an aspect, 300 μm (+4 μm) films are produced on a PTFE substrate heated at 30° C. for 12 hours and then at 65° C. for 48 hours in an oven.

In another embodiment, the precursor product is contacted with an isocyanate, a polyol or polythiol and a catechol to produce the alkyl substituted-catechol substituted polysaccharide polyurethane composition comprising:

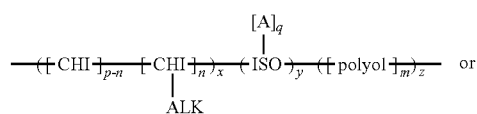

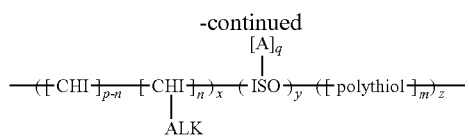

wherein CHI is a chitosan compound and ALK is an alkyl group having from 1-20 carbons, ISO=an isocyanate, A is a catechol, p=the number of monomeric units in the polysaccharide and n=the number of monomeric units modified with ALK, m=the number of monomeric units of polyol or polythiol, q=the moles of catechol used to produce the composition, x=the moles of polysaccharide used to produce the composition, y=the moles of isocyanate used to produce the composition and z=the moles of polyol or polythiol used to produce the composition. In an aspect, the p and n values range from about 5 to about 650 and m ranges from about 5 to about 10,000. In another aspect, the molar rations of q, x and z range from 0.001 to 1 and y=1.

In another embodiment, the precursor product is then contacted with an isocyanate, a polyol or polythiol, a catechol, and optionally an organotin compound to produce the alkyl substituted-catechol substituted polysaccharide polyurethane composition.

In an aspect of the methods described herein, when the chitosan compound contacts the aldehyde compound, the step typically occurs in the presence of an organic solvent. Any organic solvent that is compatible with the components used in the methods and compositions described herein can be used, as will be understood by those skilled in the art. A reducing agent next contacts the imine intermediate to reduce the imine double bond to produce an alkylated amine. Any reducing agent that is compatible with the components used in the methods and compositions described herein can be used, as will be understood by those skilled in the art. In an aspect, the reducing agent is sodium cyanoborohydride or sodium borohydride. In an aspect of the methods described herein, alkyl substituted chitosan contacts a polyol or polythiol, isocyanate and a catechol used to produce the composition, the step typically occurs in the presence of an organic solvent. Any organic solvent that is compatible with the components used in the methods and compositions described herein can be used, as will be understood by those skilled in the art. In an aspect the molar ratio of isocyanate/PEG/alkyl chitosan composition/catechol=1 to 0.85 to 0.1 to 0.05. In an aspect a solvent mixture of n-butyl acetate/naphtha 100 (1:1/v:v) was utilized with a 70% solid content. In an aspect, 76 μm films were made using an automatic film applicator-1137. The coating was dried at room temperature for 12 hours and then in an oven at 65° C. for 48 hours.

In another embodiment of the present invention, a sugar, and an isocyanate contact a polyol or polythiol compound, the step typically occurs in the presence of an organic solvent. Any organic solvent that is compatible with the components used in the methods and compositions described herein can be used, as will be understood by those skilled in the art. In an aspect the molar ratio of isocyanate/PEG/MGP=1 to 0.69 to 0.81. In an aspect, 300 μm (+4 μm) films were made on a PTFE substrate heated at 70° C.

In another embodiment of the present invention, a sugar, and an isocyanate contact a polyol or polythiol compound optionally in the presence of an organotin compound, the step typically occurs in the presence of an organic solvent. Any organic solvent that is compatible with the components used in the methods and compositions described herein can be used, as will be understood by those skilled in the art.

As another embodiment of the present invention, a method of repairing mechanical damage to a substrate is provided. In this embodiment, an alkyl substituted polysaccharide polyurethane composition is applied to a substrate. One such alkyl substituted polysaccharide polyurethane composition comprises:

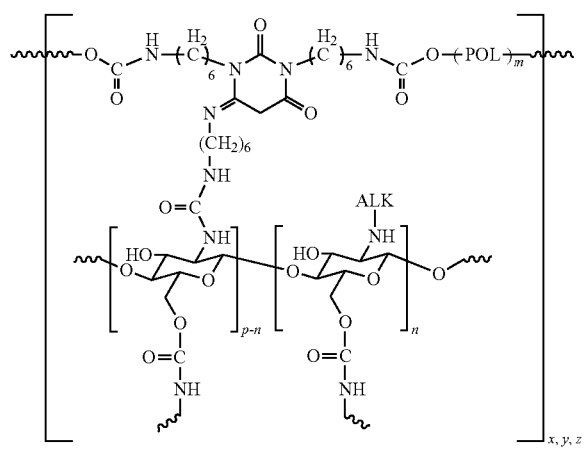

wherein POL=a polyol or a polythiol, alkyl is an alkyl group having 1 to 20 carbons; p=the number of monomeric units in the polysaccharide and n=the number of monomeric units modified with ALK, m=the number of monomeric units of polyol or polythiol, x=the moles of polysaccharide used to produce the composition, y=the moles of isocyanate used to produce the composition and z=the moles of polyol or polythiol used to produce the composition. In an aspect, the molar ratios of x and z range from 0.001 to 1 and y=1.

Once the composition described herein is applied to the substrate, the substrate is exposed to mechanical damage to initiate self-repair of the damage to the substrate. The compositions described herein repair mechanical damage to a substrate upon application of the compositions described herein. Upon exposure of the substrate to an ultraviolet source, the composition initiates self-repair of the mechanical damage to the substrate.

As another method embodiment of the present invention, a method of repairing corrosive and/or mechanical damage to a substrate is provided. In this embodiment, an alkyl substituted-catechol substituted polysaccharide polyurethane composition is applied to a substrate. One such alkyl substituted-catechol substituted polysaccharide polyurethane composition comprises:

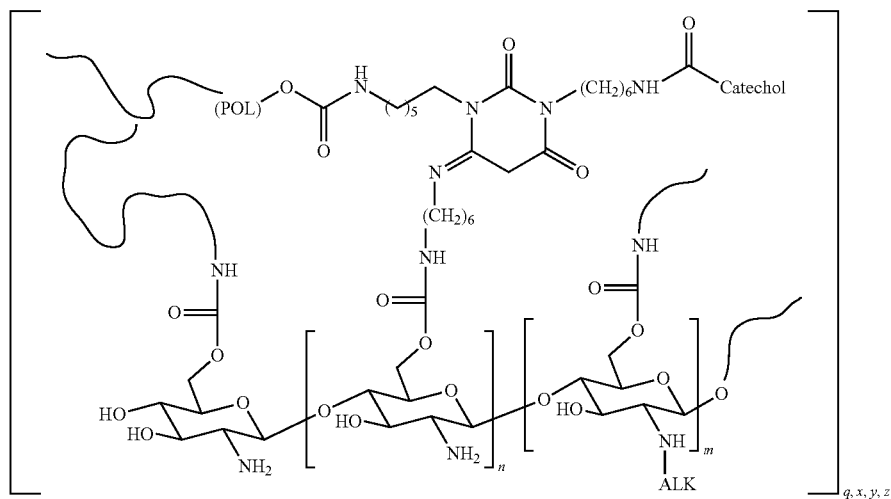

wherein ALK is an alkyl group having from 1-20 carbons, n=the number of monomeric units in the polysaccharide, m=the number of monomeric units modified with ALK, q=the moles of catechol used to produce the composition, x=the moles of polysaccharide used to produce the composition, y=the moles of isocyanate used to produce the composition and z=the moles of polyol or polythiol used to produce the composition. In an aspect, the molar rations of q, x and z range from 0.001 to 1 and y=1.

Once the composition described herein is applied to the substrate, the substrate is exposed to an ultraviolet source and/or a ferric ion source to initiate self-repair of the damage to the substrate. The compositions described herein repair mechanical damage and/or corrosion damage to a substrate upon application of the compositions described herein. Upon exposure of the substrate to mechanical and/or a corrosion source, the composition initiates self-repair of the corrosion damage to the substrate.

As another embodiment of the present invention, a further method of repairing mechanical damage to a substrate is provided. In this embodiment, a sugar polyurethane composition is applied to a substrate. One such sugar polyurethane composition comprises:

$[SUG]_x$-$[ISO]_y$-$[polyol]_z$ or $[SUG]_x$-$[ISO]_y$-$[polythiol]_z$ wherein SUG=a sugar, ISO=an isocyanate, and a polyol or polythiol; x=the moles of the sugar compound used to produce the composition, y=the moles of the isocyanate used to produce the composition and z=the moles of the polyol or polythiol used to produce the composition.

Once the composition described herein is applied to the substrate, the substrate is exposed to mechanical damage and treatment with a carbon dioxide-water source initiates self-repair of the damage to the substrate.

In embodiments using chitosan, the chitosan can have a degree of deacetylation ranging from a lower end of about 50%, 55%, 60%, 65%, 70%, 75%, 80%, 85%, 90%, 95%, or 99% to an upper end of about 60%, 65%, 70%, 75%, 80%, 85%, 90%, 95% or 99%. Chitosan having other degrees of deacetylation can be used as will be understood by those of skill in the art.

The alkyl compound can be supplied using various aldehydes.

The compositions and methods described herein can be used in many types of applications. The types of substrates on which the compositions can be applied thereto can include, but are not limited to, ceramic, composites, glass, metal, plaster, polymers, wood human tissue, animal tissue or combinations thereof. More specifically, the types of substrates on which the compositions can be applied thereto, used in or to make, can include motor crafts, automobile body parts, windshields, tires, wheels, paint, moldings, resins, glass, mechanical parts, weapons, military equipment, watercrafts, sports equipment, helmets, mirrors, picture frames, furniture, fabrics, jewelry, lenses, eyewear, glasses, eyewear frames, nail polish, nails (natural and artificial), artificial nails, hair (natural and artificial), teeth (natural and artificial), electronics, or combinations thereof. The compositions and methods described herein can be used in other applications, such as on different substrates, as will be apparent to those of skill in the art and are to be considered within the scope of the present invention.

Turning to the Figures, FIG. 1 illustrates a two-step reaction sequence leading to the formation of an alkyl substituted polysaccharide polyurethane composition. In the first reaction step used for the synthesis of

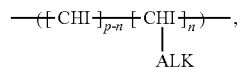

the primary amine of chitosan is reacted with an aldehyde, n-dodecyl aldehyde, which is subsequently reacted with a reducing agent, sodium cyanoborohydride to produce the product. The second reaction step illustrates the reaction leading to the formation of an alkyl substituted polysaccharide polyurethane composition, solid film.

FIG. 2 illustrates a two-step reaction sequence leading to the formation of an alkyl substituted-amine substituted polysaccharide polyurethane composition. In the first reaction step used for the synthesis of

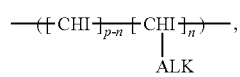

the primary amine of chitosan is reacted with an aldehyde, n-dodecyl aldehyde, which is subsequently reacted with a reducing agent, sodium cyanoborohydride to produce the product. The second reaction step illustrates the reaction leading to the formation of an alkyl substituted-catechol substituted polysaccharide polyurethane composition, solid film.

FIG. 3 is a schematic illustrating the synthetic step involved in the formation of $[SUG]_x$-$[TH]_y$-$[polyol]_z$ or $[SUG]_x$-$[TH]_y$-$[polythiol]_z$ compositions in accordance with the embodiments of the present invention.

FIG. 4 is a graphical illustration showing mechanical damage to an alkyl substituted-catechol substituted polysaccharide polyurethane composition followed by repair after exposure to ultraviolet light for 30 minutes.

FIG. 5 B1 is a graphical illustration showing the time zero point in an experiment where an alkyl substituted polysaccharide polyurethane composition is corrosion tested for 36 hours. The alkyl substituted polysaccharide polyurethane demonstrated no self repair, See, B1'. In FIG. 5 B2 an alkyl substituted catechol substituted polysaccharide polyurethane composition is corrosion tested for 36 hours and leads to repair in accordance with embodiments of the present invention.

FIG. 6: Upon mechanical damage, a sugar polyurethane exhibits self-healing properties in the air, See, A. When the sugar polyurethane was exposed to $N_2$, See, B, $O_2$, See, C, $CO_2$, See, D, and $H_2O$ (8% RH in $N_2$), See E, all for 20 min, the sugar polyurethane composition did not exhibit self-healing attributes. In F—the sugar polyurethane composition exhibited self-healing properties in the presence of $CO_2$ and $H_2O$ (8% RH) after 20 min. As a control, in G—a PEG-isocyanate polyurethane did not exhibit self-healing attributes in the air. No external sources of energy were utilized. The experiments were carried out at 25° C.

FIG. 7: A1. IRIRI image of the 1562 $cm^{-1}$ band due to amide II vibration of polyurethane within the sugar polyurethane film immediately after damage; A2—IRIRI image of the 1562 $cm^{-1}$ band due to amide II vibration of polyurethane within the sugar polyurethane film after 20 min exposure to $CO_2$ and $H_2O$; B—IR spectra recorded from the areas a and b of image A1; C—IR spectra recorded from the areas a' and b' of image A2 (arrows indicate IR band intensity changes between areas a/a' and b/b'.)

FIG. 8 ATR-FTIR spectra of the sugar polyurethane model network (crosslinked without PEG) inside the damage (b) and outside the damage (a). The network was damaged under $N_2$ atmosphere to exclude possible immediate reaction between damaged species and $CO_2/H_2O$ from air.

EXAMPLES

Example 1

Materials

Chitosan (CHI) (degree of deacetylation 70-85%), dodecyl aldehyde, sodium cyanoborohydride, ethanol, dimethylformamide (DMF), n-butyl acetate, polyethylene glycol (PEG) ($M_w$=300), sodium hydroxide beads, N,N-dimethylformamide (DMF), dimethyl sulfoxide (DMSO), dibutyltin dilaurate (DBTDL), and methyl α-D-glucopyranoside (MGP) were purchased from the Sigma Aldrich Co. The compound 3,5-Bis(6-isocyanatohexyl)-6-((6-isocyanatohexyl)imino)-1,3,5-oxadiazinane-2,4-dione was obtained from Bayer Materials Science. Naphtha 100 was purchased from Sherwin Williams.

Methyl α-D-glucopyranoside (MGP), N,N-dimethylformamide (DMF), and dibutyltin dilaurate (DBTL) were purchased from the Sigma Aldrich Company. The tri-functional isocyanate, for example, N3900a, was purchased from Bayer Material Science. Sugar polyurethanes were prepared by reacting the isocyanate with dissolved MGP in DMF using overhead agitation at 500 rpm with a small four-blade polytetrafluoroethylene (PTFE) impeller in a 50 ml three-neck reaction flask at 25° C. for 10 min under a nitrogen atmosphere. The ratio of isocyanate and MGP was adjusted by stoichiometric ratios of NCO and OH reactive groups. The molar ratio of isocyanate/MGP=1/0.75 was utilized while maintaining 38% (w/w) solids. The amount of DBTDL used was 0.17% w/w. Such mixtures were used to obtain an approximate film thickness of 300 μm (±4 μm) on a PTFE substrate at 70° C.

Microscopic micro attenuated total reflectance Fourier transform infrared (μATR FT-IR) were obtained using a Bio-Rad FTS-6000 FTIR single-beam spectrometer setting at 4 $cm^{-1}$ resolution. A 2 mm Ge crystal, with a 450 face angle maintaining constant contact pressure between crystal and the film specimens was used. All spectra were corrected for spectral distortions and optical effects using Urban-Huang algorithm.

Internal reflection infrared (IRIR) images were obtained using a Bio-Rad FTS 7000 Stingray system equipped with internal reflection IR imaging providing 1 micron spatial resolution. This system consists of a Bio-Rad FTS 7000 spectrometer, a Varian 600 UMA microscope, an image IR focal plane array (FPA) image detector, and internal reflection IR imaging. The IR images were collected using the following spectral acquisition parameters: under sampling ratio 2, rapid-scan speed 5 Hz, number of images per step 64, and spectral resolution 4 cm-1. In a typical experiment, spectral data set acquisition time was 1 min and image processing was performed using ENVI software (The Environment for Visualizing Images, Research Systems, Inc.) version 3.5.

Example 2

Methods

Preparation of Alkyl Substituted Chitosan Composition.

Chitosan, degree of deacetylation 70-85%, was reacted with dodecyl aldehyde using sodium cyanoborohydride as the reducing agent in 1% acetic acid aqueous solution and ethanol mixture for 48 hours at room temperature. The product was precipitated by adding 50% NaOH aqueous solution and ethanol, followed by washing with ethanol and deionized water.

Preparation of alkyl substituted polysaccharide polyurethane composition and films.

The alkyl substituted chitosan composition from Example 1 was dispersed by sonicating for 24 h in a DMF/n-butyl acetate (50:50/v:v) solvent mixture. The dispersed alkyl substituted chitosan composition was reacted with the isocyanate, 3,5-bis(6-isocyanatohexyl)-6-((6-isocyanatohexyl)imino)-1,3,5-oxadiazinane-2,4-dione, and polyethylene glycol (PEG) using overhead agitation at 500 rpm with a small four-blade polytetrafluoroethylene (PTFE) impeller in a 50 ml three-neck reaction flask at 25° C. for 10 min under a nitrogen atmosphere. The following molar ratio of isocyanate/PEG/alkyl substituted chitosan composition=1:0.90:

0.10 was utilized, while maintaining 38% (w/w) solids. The amount of DBTDL used was 0.17% w/w. Approximately 300 μm (±4 μm) films were made on PTFE substrate at 30° C. for 12 h and then in an oven at 65° C. for 48 h.

Preparation of Alkyl Substituted-Catechol Substituted Polysaccharide Polyurethane Composition and Films.

The alkyl substituted-catechol substituted polysaccharide polyurethane composition and films were synthesized following the same procedure as in making the alkyl substituted polysaccharide polyurethane composition in Example 2 using the molar ratio of isocyanate/PEG/alkyl substituted chitosan composition/catechol=1:0.85:0.10:0.05. A solvent mixture of n-butyl acetate/naphtha 100 (1:1/v:v) was utilized with 70% solid content. The alkyl substituted-catechol substituted polysaccharide polyurethane was coated on a steel panel (Q-panel) with a thickness of 76 μm using an automatic film applicator-1137. The coating was dried at room temperature for 12 h and then in an oven at 65° C. for 48 h.

Corrosion Test.

The corrosion test was carried by making a 76 μm deep, 18 cm long scratch, followed by applying a 5% NaCl aqueous solution for 36 h. Optical images were taken before and after the corrosion test using a digital camera.

Repair Test Using a UV Source.

Scratches with controllable width and depth can be made using a Nanoindentor, as shown in FIG. 4-A1. All the scratches were thus made under controlled conditions with a depth of 60 μm (±2). The repair tests were carried by placing the damaged specimen 10 (±1) cm under a 120 W fluorescent UV lamp (Spectroline) at a 365 nm wavelength.

Preparation of Sugar Polyurethane Composition and Film.

Methyl α-D-glucopyranoside (MGP), polyethylene glycol (PEG), N,N-dimethylformamide (DMF), and dibutyltin dilaurate (DBTDL) were purchased from the Sigma Aldrich Company. The tri-functional polymeric isocyanate, for example, N3900a, was purchased from Bayer Material Science. Sugar polyurethanes were prepared by reacting the isocyanate with dissolved MGP in DMF and PEG using overhead agitation at 500 rpm with a small four-blade polytetrafluoroethylene (PTFE) impeller in a 50 ml three-neck reaction flask at 25° C. for 10 min under a nitrogen atmosphere. The ratio of isocyanate, PEG and MGP was adjusted by stoichiometric ratios of NCO, OH, and $NH_2$ reactive groups. The molar ratio of isocyanate/PEG/MGP=1/0.69/0.41 was utilized while maintaining 38% (w/w) solids. The amount of DBTDL used was 0.17% w/w. Such mixtures were used to obtain an approximate film thickness of 300 μm (±4 μm) on a PTFE substrate at 70° C.

Example 3

Results

To demonstrate the self healing properties of the compositions described herein, films were created and then mechanically damaged by creating a scratch. FIG. 4 illustrates mechanical damage to an alkyl substituted-catechol substituted polysaccharide polyurethane film. When the damaged area was exposed to a 120 W fluorescent ultraviolet lamp at 365 nm of light for 30 minutes (FIG. 4 A1 and A1'), the damaged area is repaired.

To demonstrate the self healing properties of the compositions described herein, films were created and then corrosively damaged by creating a scratch. FIG. 5 B1, B1' illustrates damage to an alkyl substituted polysaccharide polyurethane film in a corrosion test carried out over a 36 hour period. In this example, there was no corrosion inhibition. An alkyl substituted-catechol substituted polysaccharide polyurethane film was created and then corrosively damaged by creating a scratch. FIG. 5 B2, B2' illustrates corrosion inhibition in a corrosion test carried out over a 36 hour period.

To demonstrate the self healing properties of the compositions described herein, films were created and then mechanically damaged by creating a scratch. A sugar polyurethane film was created and then mechanically damaged by creating a scratch. When the damaged area was exposed to air or $CO_2$ and $H_2O$ (8% RH) for 20 min at 25° C., self repair occurred (FIGS. 6 A and F). As a control experiment, a PEG-isocyanate polyurethane was synthesized and a film was created. The film did not exhibit self-healing attributes in the air (FIG. 6G).

In an effort to determine the role of MGP on self-healing in the presence of $CO_2$ and $H_2O$, a series of experiments inside the damaged area of the sugar polyurethane film using internal reflection IR imaging (IRIRI) were conducted. The results of these experiments are shown in FIG. 7. FIG. 7, A1 represents the IRIRI image of the band due to overlapping NH—CO—NH stretching vibrations of PUA (polyurethane) and —O—C═O asymmetric stretching vibrations of tin ester from the DBTDL in the sugar polyurethane film at 1562 $cm^{-1}$ immediately after mechanical damage, whereas image A-2 was collected 20 mins later after exposure to a $CO_2/H_2O$ atmosphere. As shown, there are significant changes in the 1562 $cm^{-1}$ band intensities manifested by the disappearance of the blue area and appearance of red in the same area when going from A1 to A2, indicating an increase of band intensity in the repaired area at 1562 $cm^{-1}$. Other spectroscopic changes are shown in FIGS. 7, B and C, traces a/b and a'/b' indicated by arrows pointing upward or downward represent increases or decreases of the corresponding IR bands at specific locations marked as square a/b and a'/b' in FIGS. 7, A1 and A2. Specifically, the bands attributed to C═O stretching vibrations of urethane and 1,3,5-oxadiazinane-2,4-dione ring at 1715 and 1680 $cm^{-1}$, amide II (N—H deformation and C—N stretching) vibrations of urethane at 1535 $cm^{-1}$, and C—N—C stretching of 1,3,5-oxadiazinane-2,4-dione ring at 1360 $cm^{-1}$ decrease upon damage. The decrease of these bands as a result of mechanical damage is attributed to cleavage of urethane linkages and ring-opening of the 1,3,5-oxadiazinane-2,4-dione ring induced by mechanical damage.

In order to identify specific molecular entities responsible for bond cleavage, a series of controlled experiments utilizing model MGP and 1,3,5-oxadiazinane-2,4-dione ring crosslinked network components were conducted and ATR FT-IR analysis was performed. As shown in FIG. 8, Traces a and b, illustrate ATR FT-IR spectra collected inside and outside damage, respectively. As shown, the band at 1663 $cm^{-1}$ due to C═O stretching vibrations of MGP-O—C(═O)—NH linkage became stronger and broader after damage, and the C—O band due to stretching vibrations of urethane at 1094 $cm^{-1}$ also increase. Another band attributed to the N—H deformation vibration of amide II at 1530 $cm^{-1}$ decreases in intensity. These spectroscopic changes indicate the cleavage as well as conformational changes of the MGP-O—C(═O)—NH entities after damage. The decrease of the band intensity at 1147 $cm^{-1}$ attributed to C—O stretching vibrations of C1-O5, C5-O5, C2-O2 and C3-O3 bonds in MGP, as illustrated in FIG. 3, indicates the MGP ring opening and cleavage of urethane linkages. Besides the breakage of MGP-O—C(═O)—NH linkages, damage on the 1,3,5-oxadiazinane-2,4-dione ring is also detected. The isocyanate trimer ring (1,3,5-oxadiazinane-2,4-dione) bands due to C═O stretching at 1786 cm$^{-1}$ as well as C═N at 1715 cm$^{-1}$ and C—N stretching vibrations at 1370 cm$^{-1}$ and 1336 cm$^{-1}$ all decreased in intensity after damage.

There are several chemical and physical processes involving MGP, $CO_2$ and $H_2O$ that lead to the repair of the damaged network. IR imaging obtained from the repaired scratch indicates significant contrast of chemical composition of the repaired area compared to the undamaged area, as shown in FIGS. 7, A2 and C. A comparison of IR traces of a' and b', collected from repaired and undamaged areas shown in FIG. 7, A2, respectively, show increase of the band intensities at 1562, 1429, and 1360 cm$^{-1}$, indicate enhanced concentration levels of tin from the reagent DBTDL near damaged interface during repair. Since 1562 cm$^{-1}$ is due to the overlap of N—H stretching vibrations of polyurethane and —O—C═O asymmetric stretching vibrations of the tin esters from DBTDL, the increase of the band at 1562 cm$^{-1}$ together with the increase of the band at 1629 cm$^{-1}$ due to C═O stretching vibrations of polyurethane, indicate the formation of urea linkages inside the repaired area. Elevated levels of MGP and the formation of new C—O or C—O—C(═O)— linkages between MGP molecules inside the repaired area are manifested by the increase of the band intensities at 1072 cm$^{-1}$ and 1041 cm$^{-1}$ due to C6-O6 and C4-O4 band stretching vibrations in MGP. As stated earlier, upon damage, bond cleavage mainly occurs at the 1,3,5-oxadiazinane-2,4-dione ring, MGP cyclic ring, and urethane-MGP linkages. The formation of new polyurethane and C—O—C linkages between MGP units in the presence of $CO_2$ and $H_2O$ catalyzed by tin from the reagent DBTDL are involved in repair of these networks.

The proposed mechanism of urethane and carbonate linkages formations is depicted in FIG. 9. Facilitated by initial coordination with $H_2O$, as shown in FIG. 9, A, Sn center complexes with MGP through chelation with neighboring MGP-OH and urethane C═O groups to form a ring structure (a). In an effort to determine the most energetically favorable structure of (a), we also equilibrated the Sn complex center to identify its structural features which are depicted in FIG. 3, B. The next step involves $CO_2$ insertion into Sn—O bonds forming carbonate moieties (FIG. 9, A(b)). It should be noted that the majority of $CO_2$ insertion reactions to Sn—O bonds are conducted under 1 atm of $CO_2$. Since reaction shown in FIG. 9 occurs under ambient conditions as shown in IR and Raman spectral analysis, MGP urethane and Sn complexation facilitates $CO_2$ insertion and subsequent urethane and carbonate formation that lead to network repair. In the final step, the metal carbonate moieties shown in FIG. 9, A(b) are subject to nucleophilic attack. As shown in spectroscopic analysis, three major nucleophilic sites are present after damage: PEG-OH after cleavage and hydrolysis, N—H of urethane groups, and NH2 resulting from cleavage of urethane linkages. As shown in FIG. 9, A(c), the PEG-OH nucleophiles result in carbonate linkages, N—H and NH$_2$ end groups lead to reformation of urethane linkages shown in FIG. 9, A(d) and (e), respectively. These reactions combined leading to self-repair of MGP-PUR network.

Notably, according to various embodiments of the present invention, the polymer networks of the present invention do not require photo-initiated reactions. Accordingly, in some embodiments, the compositions provided herein are able to reform damaged bonds by reacting with atmospheric $CO_2$ and $H_2O$ to form new covalent linkages bridging cleaved network segments. Thus, in particular embodiments, the compositions provided herein are capable of self-repair in darkness and/or under atmospheric conditions.

The foregoing is illustrative of the present invention and is not to be construed as limiting thereof. Those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed is:

1. An alkyl substituted chitosan polyurethane composition comprising a reaction product of
   a) a polyol comprising two or more hydroxy groups per compound or a polythiol comprising two or more thiol groups per compound;
   b) an isocyanate;
   c) an alkyl substituted chitosan composition comprising:

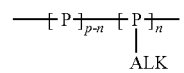

wherein CHI is a chitosan compound, ALK is $C_1$-$C_{20}$ alkyl, and p and n each independently range from about 5 to about 650; and
   d) optionally an organotin compound.

2. The composition of claim 1, wherein the reaction product further comprises a catechol.

3. The composition of claim 2, wherein the catechol is selected from the group consisting of dopa, dopamine, alpha-methyldopamine, norepinephrine, alpha-methyldopa, droxidopa, epinephrine and 4-hydroxymethylprocatechol or an enantiomer thereof.

4. The composition of claim 1, wherein the isocyanate comprises three or more isocyanate (NCO) groups per compound or combinations thereof.

5. The composition of claim 1, wherein the isocyanate comprises 3,5-bis(6-isocyanatohexyl)-6-((6-isocyanatohexyl)imino)-1,3,5-oxadiazinane-2,4-dione.

6. The composition of claim 1, wherein the polyol comprises diols, triols, tetraols, polyether polyols, polyester polyols, or combinations thereof.

7. The composition of any of claim 1, wherein the polyol comprises ethylene glycol, diethylene glycol, triethylene glycol, tetraethylene glycol, polyethylene glycol, propylene glycol, dipropylene glycol, tripropylene glycol, polypropylene glycol, 1,3-propanediol, 1,3-butanediol, 1,4-butanediol, neopentyl glycol, 1,6-hexanediol, 1,4-cyclohexanedimethanol, glycerol, polytetramethylene glycol, polyesterdiol or combinations thereof.

8. The composition of any of claim 1, wherein the polythiol comprises dithiols, trithiols, tetrathiols, polythiols or combinations thereof.

9. The composition of any of claim 1, wherein the polythiol comprises dithiols selected from the group consisting of 1,2-ethanedithiol, 1,3-propanedithiol, 1,4-butanedithiol, 2,3-butanedithiol, 1,5-pentanedithiol, benzene-1,4-dithiol, 2,2'-(ethylenedioxy)diethanethiol, 1,6-hexanedithiol, tetra(ethylene glycol) dithiol, 1,8-octanedithiol, 1,9-nonanedithiol, 1,11-undecanedithiol, 5,5'-bis(mercaptomethyl)-2,2'-bipyridine, hexa(ethylene glycol) dithiol, and 1,16-hexadecanedithiol, trithiols, tetrathiols, pentaerythritol tetrakis(3-mercaptopropionate), polythiols, and any combinations thereof.

* * * * *